US012664186B2

(12) United States Patent
Bursztyn et al.

(10) Patent No.: US 12,664,186 B2
(45) Date of Patent: Jun. 23, 2026

(54) LANGUAGE MODELS FOR READING CHARTS

(71) Applicant: ADOBE INC., San Jose, CA (US)

(72) Inventors: Victor Soares Bursztyn, Chicago, IL (US); Eunyee Koh, Sunnyvale, CA (US); Jane Elizabeth Hoffswell, Seattle, WA (US); Shunan Guo, San Jose, CA (US)

(73) Assignee: ADOBE INC., San Jose, CA (US)

( * ) Notice: Subject to any disclaimer, the term of this patent is extended or adjusted under 35 U.S.C. 154(b) by 335 days.

(21) Appl. No.: 18/183,997

(22) Filed: Mar. 15, 2023

(65) Prior Publication Data

US 2024/0311403 A1    Sep. 19, 2024

(51) Int. Cl.
G06F 16/3329 (2025.01)
G06F 16/332 (2025.01)

(52) U.S. Cl.
CPC ...... G06F 16/3329 (2019.01); G06F 16/3325 (2019.01)

(58) Field of Classification Search
CPC .......................... G06F 16/3329; G06F 16/3325
See application file for complete search history.

(56) References Cited

U.S. PATENT DOCUMENTS 10,726,252 B2 * 7/2020 Messina ................ G06V 30/412
10,909,329 B2 * 2/2021 Gao ........................ G06F 40/56
2015/0278253 A1 * 10/2015 Ahuja .................... G06F 16/244
                                                              707/731
2017/0185835 A1 * 6/2017 Appel .................. G06V 30/224
2018/0011927 A1 * 1/2018 Lee ...................... G06F 16/3329
2021/0342624 A1 * 11/2021 Wang .................... A47L 9/2852
2022/0012076 A1 * 1/2022 Natarajan .............. G06Q 10/40

OTHER PUBLICATIONS

Agrawal, et al., "VQA: Visual Question Answering", In Proceedings of the IEEE international conference on computer vision, pp. 2425-2433, arXiv preprint: arXiv:1505.00468v7 [cs.CL] Oct. 27, 2016. (Year: 2016).*

Karpathy, et al. "Deep Visual-Semantic Alignments for Generating Image Descriptions", In Proceedings of the IEEE conference on computer vision and pattern recognition, pp. 3128-3137, arXiv preprint: arXiv:1412.2306v2 [cs.CV] Apr. 14, 2015. (Year: 2015).*

(Continued)

*Primary Examiner* — Andrew C Flanders
*Assistant Examiner* — Cameron Kenneth Young
(74) *Attorney, Agent, or Firm* — F. CHAU & ASSOCIATES, LLC

(57)    ABSTRACT

Systems and methods for natural language processing are described. Embodiments of the present disclosure obtain a chart and a query via a user interface. An answer model generates an answer to the query based on the chart, wherein the answer model comprises a machine learning model trained based on chart data for the chart. A description model generates a visual description based on the answer and the chart, wherein the description model comprises a machine learning model trained based on a chart specification for the chart. A response component transmits a response to the query based on the answer and the visual description.

20 Claims, 12 Drawing Sheets

(56) References Cited

OTHER PUBLICATIONS

Wu, Jialin, and Raymond J. Mooney. "Faithful multimodal explanation for visual question answering." arXiv preprint arXiv: 1809. 02805 (2018). (Year: 2018).*

Agrawal, et al., "VQA: Visual Question Answering", In Proceedings of the IEEE international conference on computer vision, pp. 2425-2433, arXiv preprint: arXiv:1505.00468v7 [cs.CL] Oct. 27, 2016.

Bostock, et al., "D3: Data-Driven Documents", IEEE Transactions on Visualization and Computer Graphics, vol. 17, No. 12, Dec. 2011, pp. 2301-2309.

Brown, et al., "Language Models are Few-Shot Learners", 34th Conference on Neural Information Processing Systems (NeurIPS 2020), Vancouver, Canada, 33:1877-1901.

Gaba, et al., "Comparison Conundrum and the Chamber of Visualizations: An Exploration of How Language Influences Visual Design", IEEE Transactions on Visualization and Computer Graphics, arXiv preprint: arXiv:2208.03785v1 [cs.HC] Aug. 7, 2022, 11 pages.

Kafle, et al., "DVQA: Understanding Data Visualizations via Question Answering", In Proceedings of the 2018 IEEE/CVF Conference on Computer Vision and Pattern Recognition, pp. 5648-5656.

Karpathy, et al. "Deep Visual-Semantic Alignments for Generating Image Descriptions", In Proceedings of the IEEE conference on computer vision and pattern recognition, pp. 3128-3137, arXiv preprint: arXiv:1412.2306v2 [cs.CV] Apr. 14, 2015.

Kim, et al., "Answering Questions about Charts and Generating Visual Explanations", In Proceedings of the 2020 CHI conference on human factors in computing systems, Apr. 25-30, 2020, Honolulu, HI, USA, pp. 1-13.

Luo, et al., "Synthesizing Natural Language to Visualization (NL2VIS) Benchmarks from NL2SQL Benchmarks", In Proceedings of the 2021 International Conference on Management of Data, SIGMOD '21, Jun. 20-25, 2021, Virtual Event, China, pp. 1235-1247.

Pasupat, et al., "Compositional Semantic Parsing on Semi-Structured Tables", In Proceedings of the 53rd Annual Meeting of the Association for Computational Linguistics and the 7th International Joint Conference on Natural Language Processing, pp. 1470-1480, Beijing, China, Jul. 26-31, 2015.

Raffel, et al., "Exploring the Limits of Transfer Learning with a Unified Text-to-Text Transformer", Journal of Machine earning Research 21, pp. 1-67; arXiv preprint: arXiv:1910.10683v3 [cs.LG] Jul. 28, 2020.

Roberts, et al., "How Much Knowledge Can You Pack Into the Parameters of a Language Model?", Proceedings of the 2020 Conference on Empirical Methods in Natural Language Processing, pp. 5418-5426, Nov. 16-20, 2020.

Satyanarayan, et al., "Vega-Lite: A Grammar of Interactive Graphics", IEEE Transactions on Visualization and Computer Graphics vol. 23, No. 1, Jan. 2017, pp. 341-350.

Voigt, et al., "The Why and The How: A Survey on Natural Language Interaction in Visualization", In Proceedings of the 2022 Conference of the North American Chapter of the Association for Computational Linguistics: Human Language Technologies, pp. 348-374, Jul. 10-15, 2022.

Davila, et al., "Chart Mining: A Survey of Methods for Automated Chart Analysis", IEEE Transactions on Pattern Analysis and Machine Intelligence, vol. 43, No. 11, Nov. 2021, pp. 3799-3819.

Howard, et al., "Universal Language Model Fine-tuning for Text Classification", In Proceedings of the 56th Annual Meeting of the Association for Computational Linguistics (vol. 1: Long Papers) (pp. 328-339), arXiv preprint: arXiv:1801.06146v5 [cs.CL] May 23, 2018.

Chen, et al., "A Stable and Effective Learning Strategy for Trainable Greedy Decoding", In Proceedings of the 2018 Conference on Empirical Methods in Natural Language Processing (pp. 380-390), arXiv preprint: arXiv:1804.07915v2 [cs.CL] Aug. 28, 2018.

Wei, et al., "Emergent Abilities of Large Language Models", arXiv preprint: arXiv:2206.07682v2 [cs.CL] Oct. 26, 2022, 30 pages.

* cited by examiner

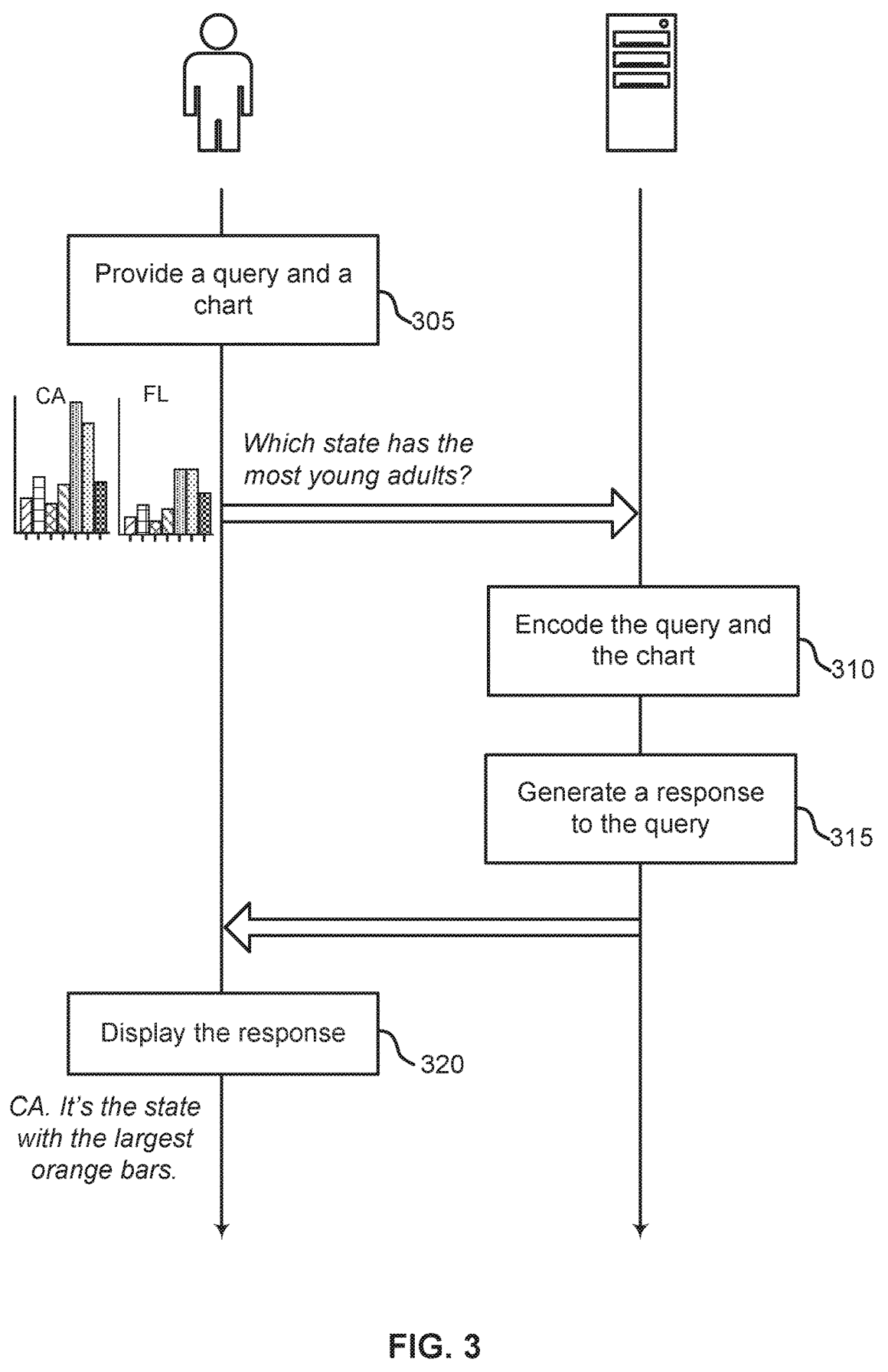

Provide a query and a chart — 305

CA     FL

*Which state has the most young adults?*

Encode the query and the chart — 310

Generate a response to the query — 315

Display the response — 320

*CA. It's the state with the largest orange bars.*

FIG. 3

*Which state has the most young adults?* } 400

*California.* 410  *It's the state with the largest orange bars.* 415

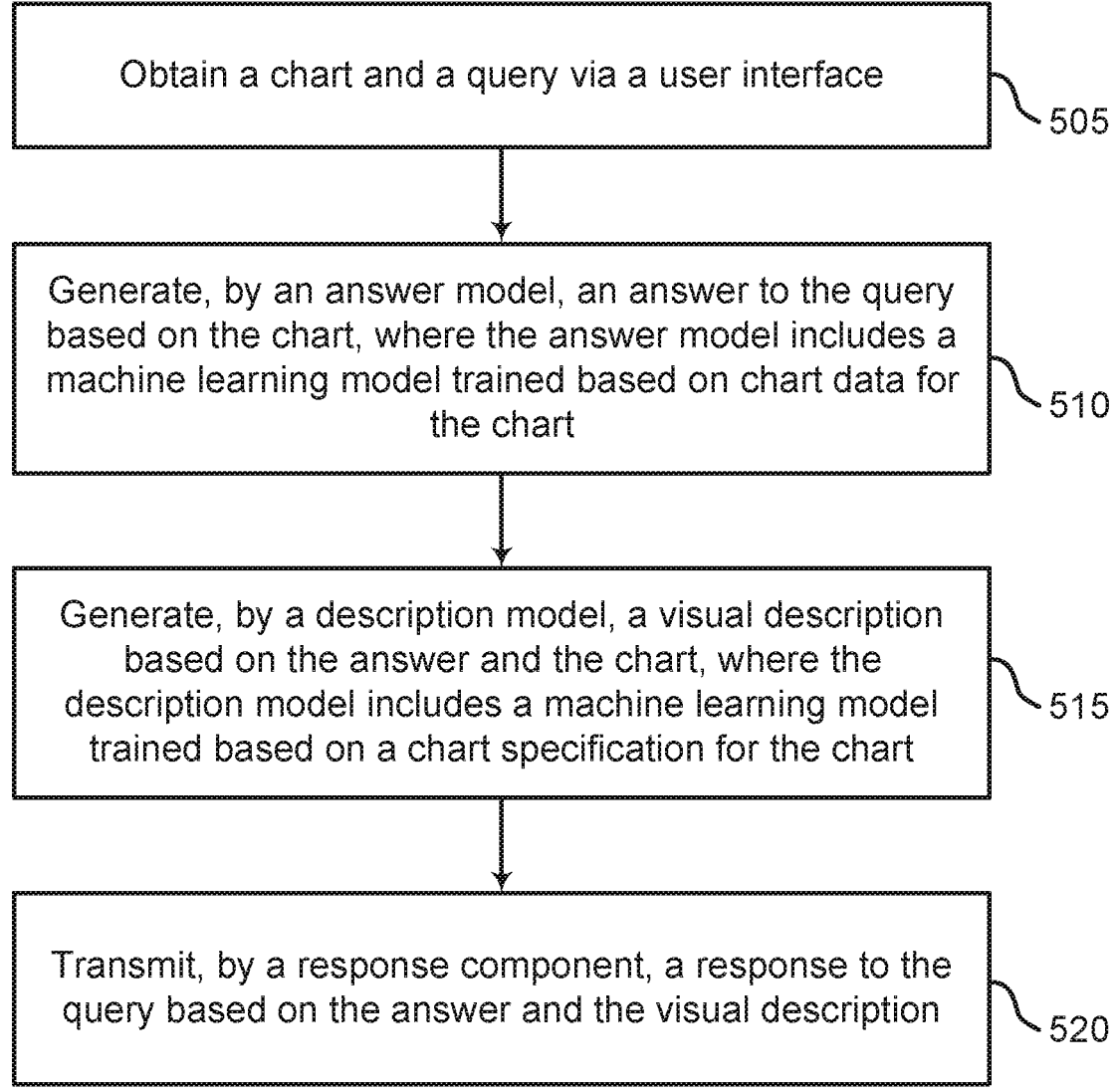

Obtain a chart and a query via a user interface

~505

Generate, by an answer model, an answer to the query based on the chart, where the answer model includes a machine learning model trained based on chart data for the chart

~510

Generate, by a description model, a visual description based on the answer and the chart, where the description model includes a machine learning model trained based on a chart specification for the chart

~515

Transmit, by a response component, a response to the query based on the answer and the visual description

Obtain training data including a query about a chart and a ground-truth visual description of the chart corresponding to the query

605

Generate a predicted visual description of the chart using a description model

610

Train the description model based on the predicted visual description and the ground-truth visual description

615

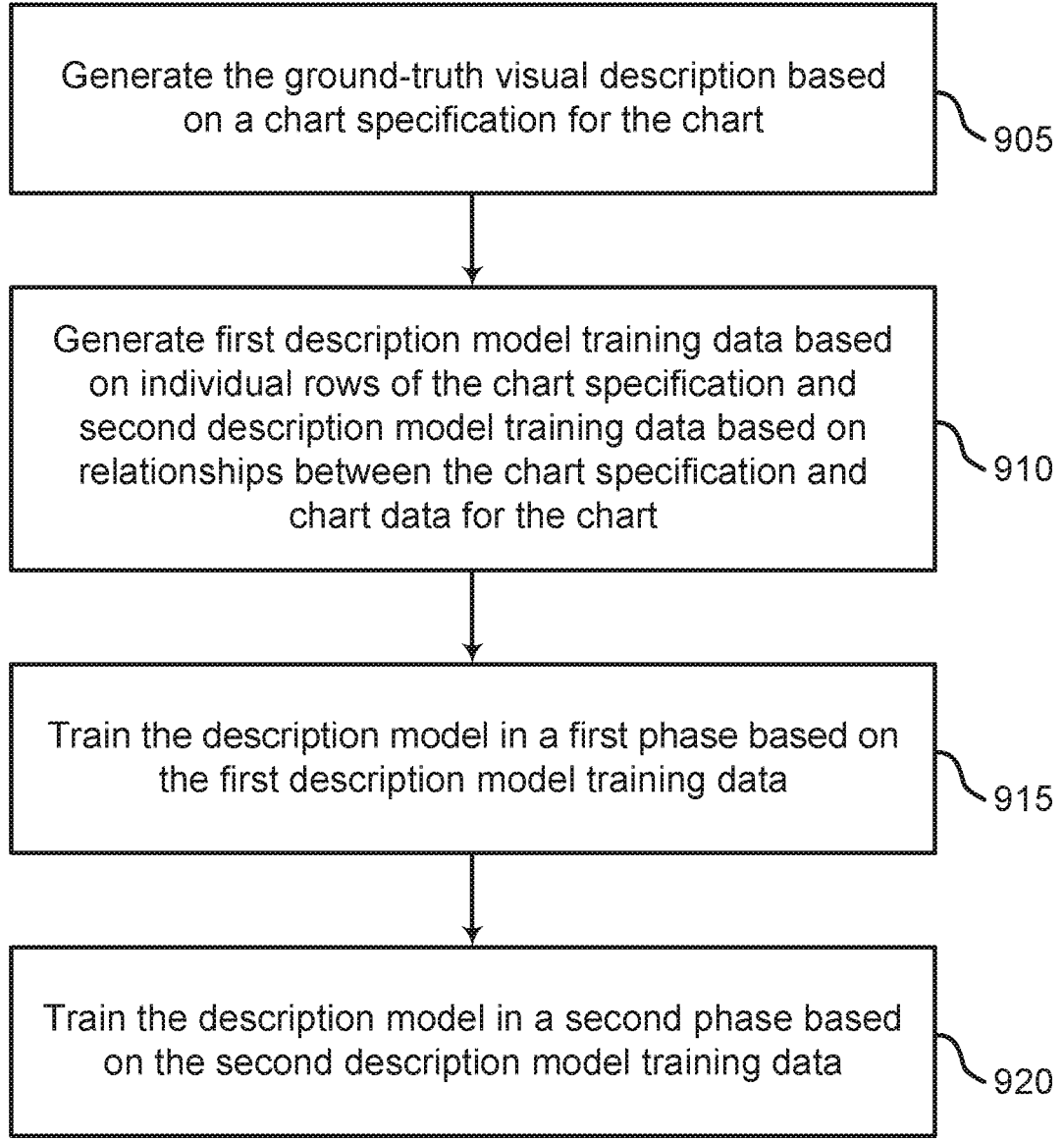

Generate the ground-truth visual description based on a chart specification for the chart ⟵ 905

Generate first description model training data based on individual rows of the chart specification and second description model training data based on relationships between the chart specification and chart data for the chart ⟵ 910

Train the description model in a first phase based on the first description model training data ⟵ 915

Train the description model in a second phase based on the second description model training data ⟵ 920

FIG. 9

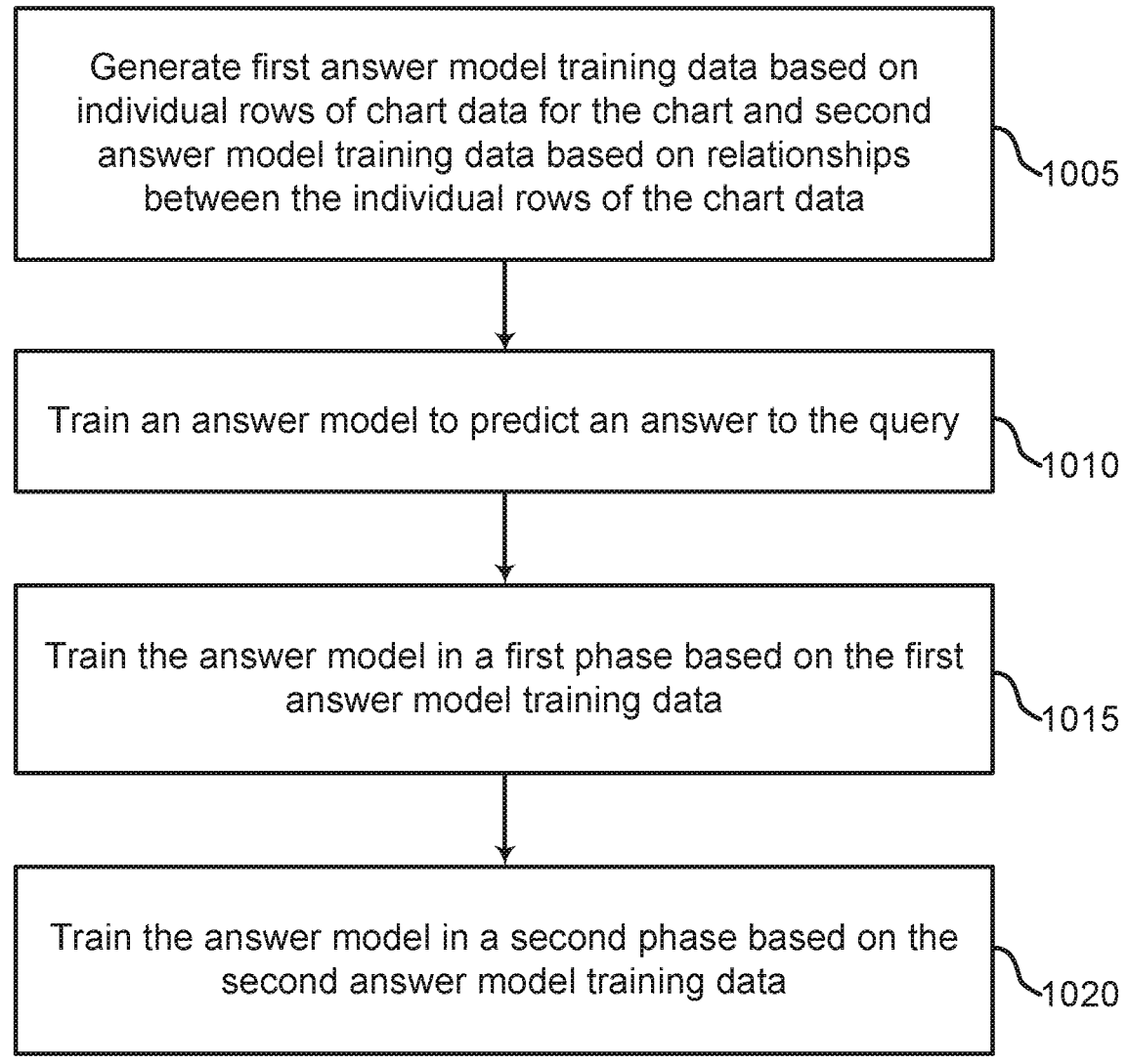

Generate first answer model training data based on individual rows of chart data for the chart and second answer model training data based on relationships between the individual rows of the chart data ⌇1005

Train an answer model to predict an answer to the query ⌇1010

Train the answer model in a first phase based on the first answer model training data ⌇1015

Train the answer model in a second phase based on the second answer model training data ⌇1020

FIG. 10

Generate a template query based on an individual row of the chart data and a query template ⟋1105

Generate a rephrased query based on the template query using a rephrasing model ⟋1110

Include the rephrased query in the first answer model training data ⟋1115

Train the answer model based on the first answer model training data ⟋1120

Figure 12:
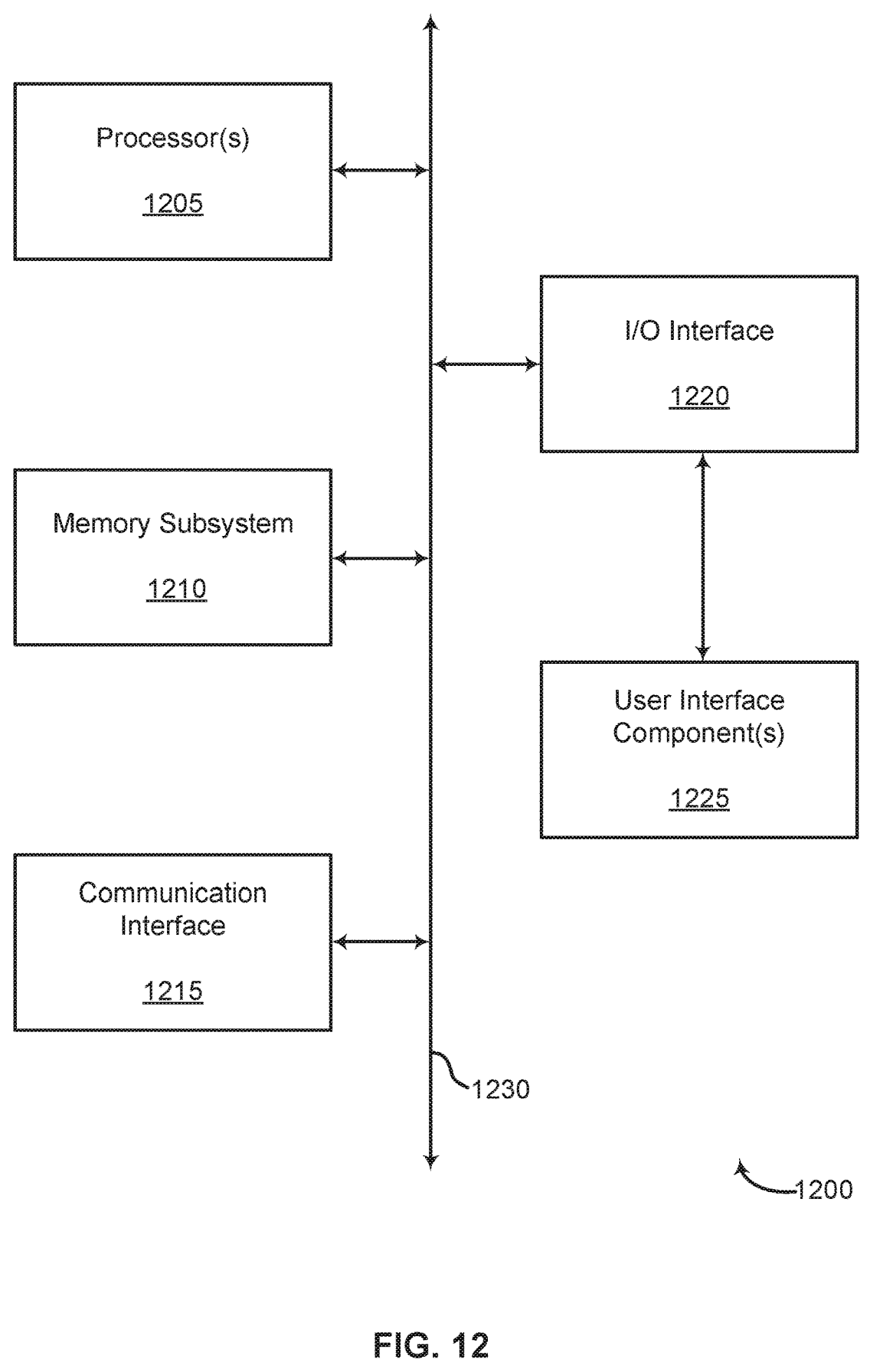

Processor(s)

1205

I/O Interface

1220

Memory Subsystem

1210

User Interface
Component(s)

1225

Communication
Interface

LANGUAGE MODELS FOR READING CHARTS

BACKGROUND

The following relates generally to natural language processing (NLP), and more specifically to question answering of charts. NLP refers to using computers to interpret natural language (i.e., language as spoken by humans). In some cases, NLP tasks involve assigning annotation data such as grammatical information to words or phrases within a natural language expression. A variety of machine learning algorithms have been applied to NLP tasks. Question answering is a subfield of NLP that refers to answer generation in response to a query dependent on some domain facts. Some question answering systems use a machine learning model that is trained to predict an answer.

Conventional models designed for chart-grounded question and answering (CQA) treat a chart as an image and these models rely on pixel-level information from the chart or are hard-coded. These models are limited to pre-defined rules, often generate inaccurate answers, and the response time at inference is high. Therefore, there is a need in the art for a NLP system that can efficiently process a chart and generate responses to a query.

SUMMARY

The present disclosure describes systems and methods for natural language processing. Embodiments of the present disclosure include a natural language processing apparatus configured to generate a response to a query based on a chart, where the response includes an answer to the query and a visual explanation. An answer model (e.g., a first language model) is trained to predict an answer to a query where the query is an unseen input. A description model (e.g., a second language model) is trained to generate a visual description or explanation based on the answer and the chart. During training, the answer model and the description model are trained via a respective two-phase training method.

A method, apparatus, and non-transitory computer readable medium for natural language processing are described. One or more embodiments of the method, apparatus, and non-transitory computer readable medium include obtaining a chart and a query via a user interface; generating, by an answer model, an answer to the query based on the chart, wherein the answer model comprises a machine learning model trained based on chart data for the chart; generating, by a description model, a visual description based on the answer and the chart, wherein the description model comprises a machine learning model trained based on a chart specification for the chart; and transmitting, by a response component, a response to the query based on the answer and the visual description.

A method, apparatus, and non-transitory computer readable medium for natural language processing are described. One or more embodiments of the method, apparatus, and non-transitory computer readable medium include obtaining training data including a query about a chart and a ground-truth visual description of the chart corresponding to the query; generating a predicted visual description of the chart using a description model; and training the description model based on the predicted visual description and the ground-truth visual description.

An apparatus and method for natural language processing are described. One or more embodiments of the apparatus and method include a processor; a memory comprising instructions executable by the processor; an answer model configured to generate an answer to a query based on a chart, wherein the answer model comprises a machine learning model trained based on chart data for the chart; a description model configured to generate a visual description based on the answer and the chart, wherein the description model comprises a machine learning model trained based on a chart specification for the chart; and a response component configured to transmit a response to the query based on the answer and the visual description.

BRIEF DESCRIPTION OF THE DRAWINGS

FIG. 3 shows an example of a question answering process according to aspects of the present disclosure.

FIG. 5 shows an example of a method for natural language processing according to aspects of the present disclosure.

FIG. 9 shows an example of a method for two-phase training of a description model according to aspects of the present disclosure.

FIG. 10 shows an example of a method for two-phase training of an answer model according to aspects of the present disclosure.

FIG. 12 shows an example of a computing device according to aspects of the present disclosure.

DETAILED DESCRIPTION

Figure 1:
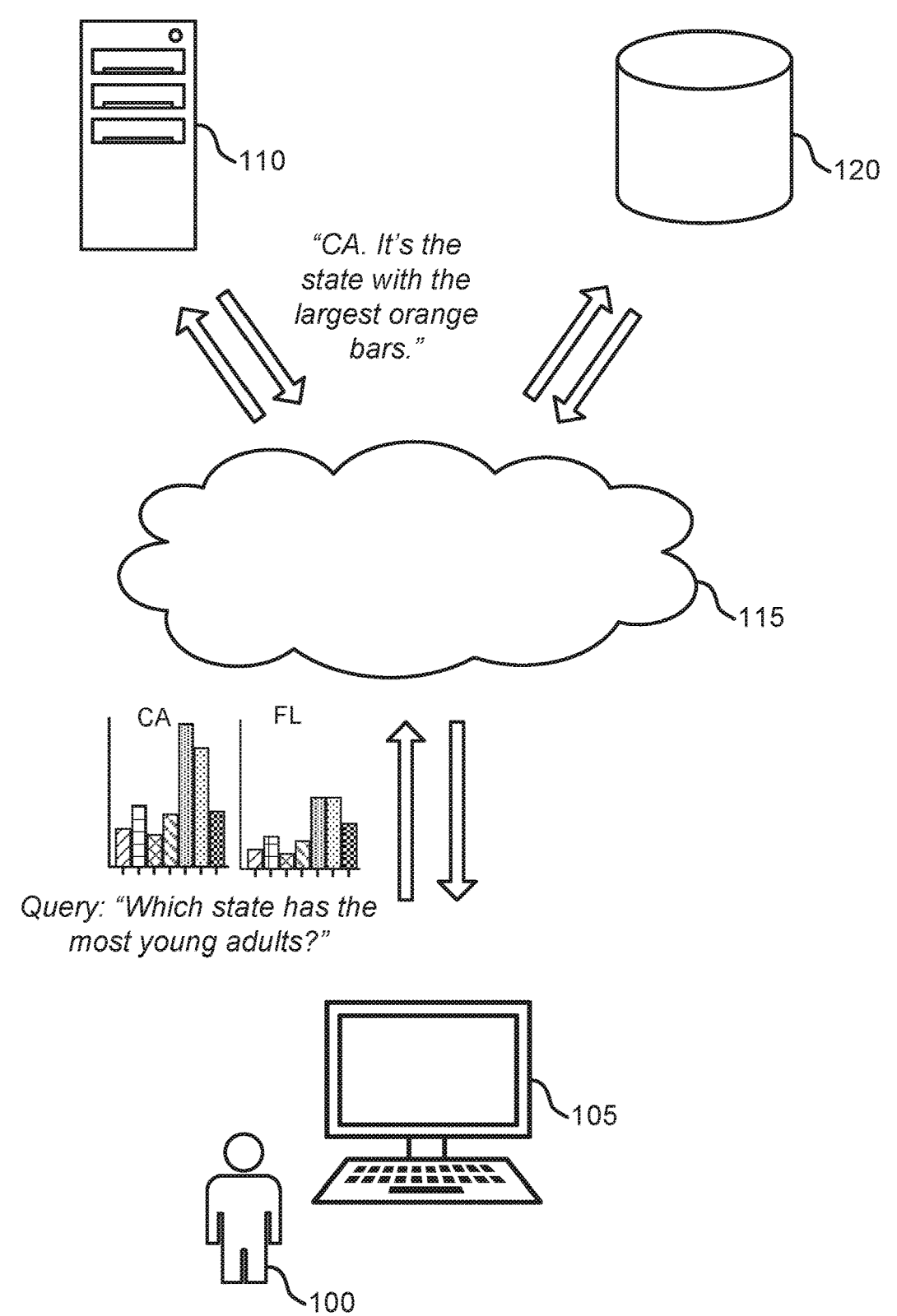
FIG. 1 shows an example of a natural language processing system according to aspects of the present disclosure.

The present disclosure describes systems and methods for natural language processing. Embodiments of the present disclosure include a natural language processing apparatus configured to generate a response to a query based on a chart, where the response includes an answer to the query and a visual explanation. An answer model (e.g., a first language model) is trained to predict an answer to a query where the query is an unseen input. A description model (e.g., a second language model) is trained to generate a visual description or explanation based on the answer and the chart. During training, the answer model and the description model are trained via a respective two-phase training method.

According to an embodiment, the query is generated based on chart data for the chart and a chart specification. A rephrasing model (e.g., a third language model) generates a rephrased query based on a template query. That is, the query is a rephrased version of the template query where the query reads more natural compared to the template query. Accordingly, embodiments of the present disclosure are robust to language variations and incorporate more natural text input for training the answer model and the description model.

Natural language processing (NLP) refers to techniques for using computers to interpret or generate natural language. Some systems use neural networks or statistical models which make soft, probabilistic decisions based on attaching real-valued weights to input features. These models can express the relative probability of multiple answers. Chart-grounded question and answering (CQA) is a subfield of NLP that relates to interpreting a query and identifying an answer to the query based on source data such as a chart or a graph. Conventional systems often treat a chart as a set of pixels and extract pixel-level information for question and answering (Q&A). These systems ignore chart data and chart specification information associated with the chart. In some other cases, conventional systems rely on hard-coded NLP rules and fail at language not anticipated by the rules. Accordingly, these conventional systems are not efficient at processing CQA and the generated answers have decreased accuracy.

The present disclosure describes systems and methods for natural language processing. Embodiments of the present disclosure include a natural language processing apparatus configured to generate a response to a query based on chart data for a chart. In some examples, the chart data is stored in a CSV file. A training component extracts domain facts from the chart data for the chart and collects input-output training examples (e.g., input-output pairs) for training the answer model. The training component also transforms a JSON file to input-output training pairs for training the description model where the input-output training pairs cover rows in the JSON file.

The answer model (e.g., a first language model) is trained via a two-phase training method. At the first training phase, the answer model is trained on a cross-entropy loss function at the token level. The answer model is trained to maximize the probability of the token(s) in the ground-truth answer (e.g., "3853788") versus other tokens not in the ground-truth, conditioned on the given input (e.g., "When state is 'CA' and age_range is '18 to 24 Years Old' the value for population is"). At a second training phase, while learning to predict the ground-truth answer ("CA") conditioned on the given input ("Question: For which state is the value for population highest when age_range is '18 to 24 Years Old'? Answer:"), the answer model makes use of the facts it learned during the first training phase to obtain a predicted answer.

According to some embodiments, a description model (e.g., a second language model) is trained, via a two-phase training method, to generate a visual description or explanation based on the answer and the chart. At a first training phase, for example, model input is "Orange bars represent" and model output is "18 to 24 Years". The description model is trained on a cross-entropy loss function at the token level. The description model tries to maximize the probability of the token(s) in the ground-truth answer (e.g., "18 to 24 Years") versus other tokens not in the ground-truth, conditioned on the given input (e.g., "Orange bars represent"). This way, the description model learns the visual-semantic relationships that are shown on the chart, preparing the description model for the second training phase. By the end of the second training phase and at inference time, the description model can take an unseen input (e.g., "Question: Which state has the most young adults? Answer: California. Explanation:") and apply the same logic it has learned during the second training phase to arrive at the visual explanation or description (e.g., "It's the state with the largest orange bars").

In some cases, the natural language processing apparatus receives a chart and a query via a user interface. The chart specification refers to a correspondence between attributes of the chart and visual properties of the chart. For example, the chart specification for a bar chart indicates orange-colored bars as representing an attribute of a particular age range (e.g., young adults). At inference time, question answering and explanation generation are two sequential tasks performed by the answer model and the description model, respectively. The natural language processing apparatus then transmits a response for the query to the user based on the predicted answer and the predicted visual description. By using chart specifications to provide visual context at training, the description model (e.g., a language model) has increased chart-reading ability. Trained based on naturally rephrased queries and the respective two-phase training method, the answer model and the description model can robustly learn the language for chart-grounded question and answering. As a result, the natural language processing apparatus has increased efficiency, accuracy, and speed generating answers and explanations in response to a query at inference time.

Additionally, a rephrasing model (e.g., a third language model) generates natural language training sentences based on template sentences obtained from the chart data. Accordingly, by generating a rephrased version of the template query that reads more natural, the natural language processing apparatus can handle language variations and is robust to paraphrasing and out-of-vocabulary words appeared in the queries and chart data for the chart.

As used herein, "answer model" refers to a machine learning model that is trained to generate an answer based on an input query and a chart. The answer model is a language model (e.g., an encoder-decoder language model) that is trained on input-output pairs comprising a prompt and a ground-truth completion (output).

As used herein, "description model" refers to a machine learning model that is trained to generate a visual description based on an answer from the answer model and the chart. The description model is a language model (e.g., an encoder-decoder language model) that is trained on visual context and question-answer pairs comprising a prompt and a ground-truth completion (output).

Embodiments of the present disclosure can be used in the context of natural language processing applications. For example, a NLP network based on the present disclosure takes a chart and a natural language query as input and efficiently generates a response to the query. An example Q&A application, according to some embodiments, is provided with reference to FIG. 3. Details regarding the architecture of an example NLP apparatus are provided with reference to FIG. 2. An example process for chart-grounded question answering is provided with reference to FIG. 5. Example training processes are described with reference to FIGS. 6-11.

Network Architecture

Figure 2:
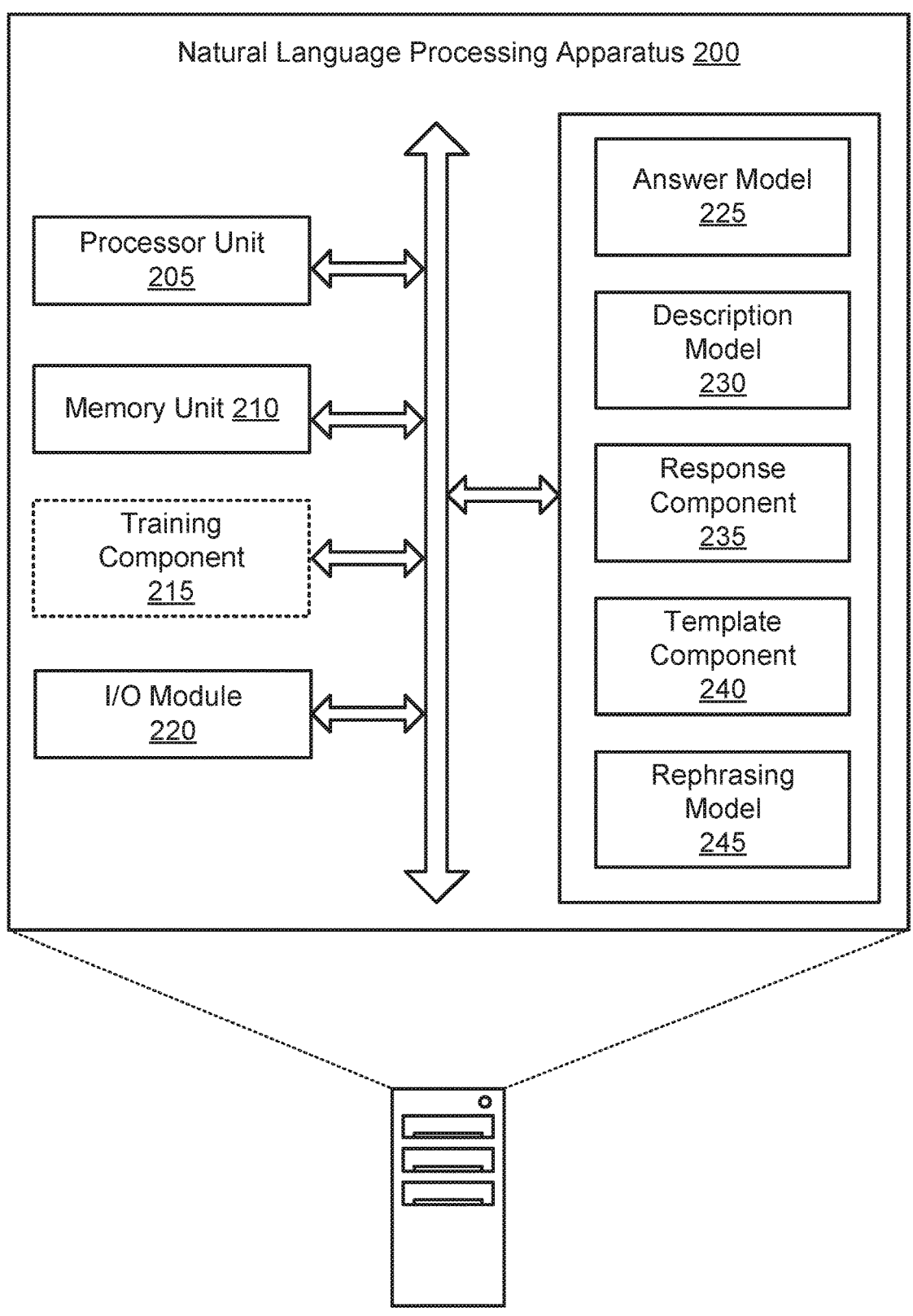
FIG. 2 shows an example of a natural language processing apparatus according to aspects of the present disclosure.

In FIGS. 1-2, an apparatus and method for natural language processing is described. One or more embodiments of the apparatus include a processor; a memory comprising instructions executable by the processor; an answer model configured to generate an answer to a query based on a chart, wherein the answer model comprises a machine learning model trained based on chart data for the chart; a description model configured to generate a visual description based on the answer and the chart, wherein the description model comprises a machine learning model trained based on a chart specification for the chart; and a response component configured to transmit a response to the query based on the answer and the visual description.

Some examples of the apparatus and method further include a template component configured to generate template sentences based on the chart data and the chart specification, wherein the answer model or the description model is trained based on the template sentences. Some examples of the apparatus and method further include a rephrasing model configured to generate additional training sentences based on the template sentences.

Some examples of the apparatus and method further include an image encoder configured to encode the chart to obtain a chart representation, wherein the description model takes the chart representation as input. Some examples of the apparatus and method further include a training component configured to train the answer model and the description model.

FIG. 1 shows an example of a natural language processing system according to embodiments of the present disclosure. The example shown includes user 100, user device 105, natural language processing apparatus 110, cloud 115, and database 120. Natural language processing apparatus 110 is an example of, or includes embodiments of, the corresponding element described with reference to FIG. 2.

As an example shown in FIG. 1, user 100 provides a chart and a query to natural language processing apparatus 110 via a user interface on user device 105. The query is a natural language statement and relates to chart data of the chart. Natural language processing apparatus 110 is configured to generate a response to the query, where the response includes an answer to the query and visual explanation that relates to visual elements or visual context of the chart.

Here, user 100 uploads a bar chart and inputs a query (e.g., "Which state has the most young adults?"). Natural language processing apparatus 110 includes a first language model (e.g., an answer model) that is trained to generate "California" as the answer to the query. Additionally, natural language processing apparatus 110 includes a second language model (e.g., a description model) that is trained to generate visual explanation "It's the state with the largest orange bars" as a visual explanation. This way, user 100 can understand the answer in the visual context of the bar chart. User 100 can easily connect visual element (e.g., the orange bar) with chart attribute (e.g., an age group that falls under "young adults"). Natural language processing apparatus 110 returns the answer and the visual description to user 100 via cloud 115 and user device 105. The processing of using natural language processing apparatus 110 is further described with reference to FIG. 5.

User device 105 may be a personal computer, laptop computer, mainframe computer, palmtop computer, personal assistant, mobile device, or any other suitable processing apparatus. In some examples, user device 105 includes software that incorporates a natural language processing application (e.g., a question answering application). The question answering application may either include or communicate with natural language processing apparatus 110. In some examples, the question answering application on user device 105 may include functions of natural language processing apparatus 110.

A user interface may enable user 100 to interact with user device 105. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a user interface may be represented in code which is sent to the user device and rendered locally by a browser.

Natural language processing apparatus 110 includes a computer implemented network. Natural language processing apparatus 110 may also include a processor unit, a memory unit, an I/O module, and a training component. The training component is used to train a machine learning model. Additionally, natural language processing apparatus 110 can communicate with database 120 via cloud 115. In some cases, the architecture of the natural language processing network is also referred to as a network or a network model. Further detail regarding the architecture of natural language processing apparatus 110 is provided with reference to FIG. 2. Further detail regarding the operation of natural language processing apparatus 110 is provided with reference to FIG. 5.

In some cases, natural language processing apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general-purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location.

Database 120 is an organized collection of data. For example, database 120 stores data in a specified format known as a schema. Database 120 may be structured as a single database, a distributed database, multiple distributed databases, or an emergency backup database. In some cases, a database controller may manage data storage and processing in database 120. In some cases, a user interacts with database controller. In other cases, database controller may operate automatically without user interaction.

FIG. 2 shows an example of a natural language processing apparatus 200 according to embodiments of the present disclosure. According to one embodiment of the present disclosure, natural language processing apparatus 200 includes processor unit 205, memory unit 210, training component 215, I/O module 220, answer model 225, description model 230, response component 235, template component 240, and rephrasing model 245. Natural language processing apparatus 200 is an example of, or includes embodiments of, the corresponding element described with reference to FIG. 1. In some examples, training component 215 may be implemented on another apparatus other than natural language processing apparatus 200. In some examples, a machine learning model includes answer model 225, description model 230, response component 235, template component 240, and rephrasing model 245.

Processor unit 205 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor unit 205 is configured to operate a memory array using a memory controller. In other cases, a memory controller is integrated into processor unit 205. In some cases, processor unit 205 is configured to execute computer-readable instructions stored in a memory to perform various functions. In some embodiments, processor unit 205 includes special purpose components for modem processing, baseband processing, digital signal processing, or transmission processing. According to some embodiments, processor unit 205 is configured to perform operations of answer model 225, description model 230, and rephrasing model 245.

Memory unit 210 includes instructions executable by processor unit 205. Examples of memory unit 210 include random access memory (RAM), read-only memory (ROM), or a hard disk. Examples of memory unit 210 include solid state memory and a hard disk drive. In some examples, memory unit 210 is used to store computer-readable, computer-executable software including instructions that, when executed, cause a processor to perform various functions described herein. In some cases, memory unit 210 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state. Memory unit 210 includes parameters of answer model 225, description model 230, and rephrasing model 245.

According to some embodiments of the present disclosure, natural language processing apparatus 200 includes a computer implemented artificial neural network (ANN) for NLP tasks such as natural language understanding and question answering. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

In ANNs, a hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the neural network. Hidden representations are machine-readable data representations of an input that are learned from a neural network's hidden layers and are produced by the output layer. As the neural network's understanding of the input improves as it is trained, the hidden representation is progressively differentiated from earlier iterations.

During a training process of an ANN, the node weights are adjusted to increase the accuracy of the result (i.e., by attempting to minimize a loss which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

According to some embodiments, training component 215 obtains training data including a query about a chart and a ground-truth visual description of the chart corresponding to the query. Training component 215 trains description model 230 based on the predicted visual description and the ground-truth visual description. In some examples, training component 215 generates the ground-truth visual description based on a chart specification for the chart. In some examples, training component 215 generates first description model training data based on individual rows of the chart specification and second description model training data based on relationships between the chart specification and chart data for the chart. Training component 215 trains the description model in a first phase based on the first description model training data and in a second phase based on the second description model training data.

In some examples, training component 215 generates first answer model training data based on individual rows of chart data for the chart and second answer model training data based on relationships between the individual rows of the chart data. Training component 215 trains answer model 225 to predict an answer to the query, where answer model 225 is trained in a first phase based on the first answer model training data and in a second phase based on the second answer model training data. In some examples, training component 215 is implemented or configured as part of an apparatus other than natural language processing apparatus 200.

Each of answer model 225 and description model 230 is a machine learning model. A machine learning model makes predictions based on input data in an application. Developing a machine learning model is an iterative process of writing, editing, re-writing, and testing configurations, algorithms, and model parameters. The process includes the stages of acquiring and exploring data, identifying features of the data, creating a model, training the model based on a training dataset, evaluating the model, making predictions, and developing insights based on the model. A trained machine learning model can then be implemented on a large-scale platform providing for other users to deploy functionalities and capabilities from large datasets across different use cases.

I/O module 220 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via I/O controller or via hardware components controlled by an I/O controller.

In some examples, I/O module 220 includes a user interface. A user interface may enable a user to interact with a device. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a communication interface operates at the boundary between communicating entities and the channel and may also record and process communications. Communication interface is provided herein to enable a processing system coupled to a transceiver (e.g., a transmitter and/or a receiver). In some examples, the transceiver is configured to transmit (or send) and receive signals for a communications device via an antenna.

According to some embodiments, answer model 225 generates an answer to the query based on the chart, where the answer model includes a machine learning model trained based on chart data for the chart. In some examples, answer model 225 predicts a set of probability values for candidate answers based on the query. Answer model 225 selects the answer based on the set of probability values. According to some embodiments, answer model 225 identifies an answer to the query, where the predicted visual description is generated based on the answer. Answer model 225 is an example of, or includes aspects of, the corresponding element described with reference to FIG. 8.

According to some embodiments, description model 230 generates a visual description based on the answer and the chart, where the description model includes a machine learning model trained based on a chart specification for the chart. In some examples, description model 230 generates a predicted visual description of the chart. Description model 230 is an example of, or includes aspects of, the corresponding element described with reference to FIG. 8.

According to some embodiments, response component 235 transmits a response to the query based on the answer and the visual description. Response component 235 is an example of, or includes aspects of, the corresponding element described with reference to FIG. 8.

According to some embodiments, template component 240 generates a template description based on the chart specification, where the ground-truth visual description is generated based on the template description using rephrasing model 245. In some examples, template component 240 generates a template query based on an individual row of chart data for the chart and a query template, where the query includes a rephrased version of the template query. According to some embodiments, template component 240 is configured to generate template sentences based on the chart data and the chart specification, wherein answer model

225 or description model 230 is trained based on the template sentences. Template component 240 is an example of, or includes aspects of, the corresponding element described with reference to FIG. 8.

According to some embodiments, rephrasing model 245 generates a rephrased query based on the template query, where the first answer model training data includes the rephrased query. According to some embodiments, rephrasing model 245 is configured to generate additional training sentences based on the template sentences. Rephrasing model 245 is an example of, or includes aspects of, the corresponding element described with reference to FIG. 8.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EE-PROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

Chart-Grounded Question Answering

Figure 4:
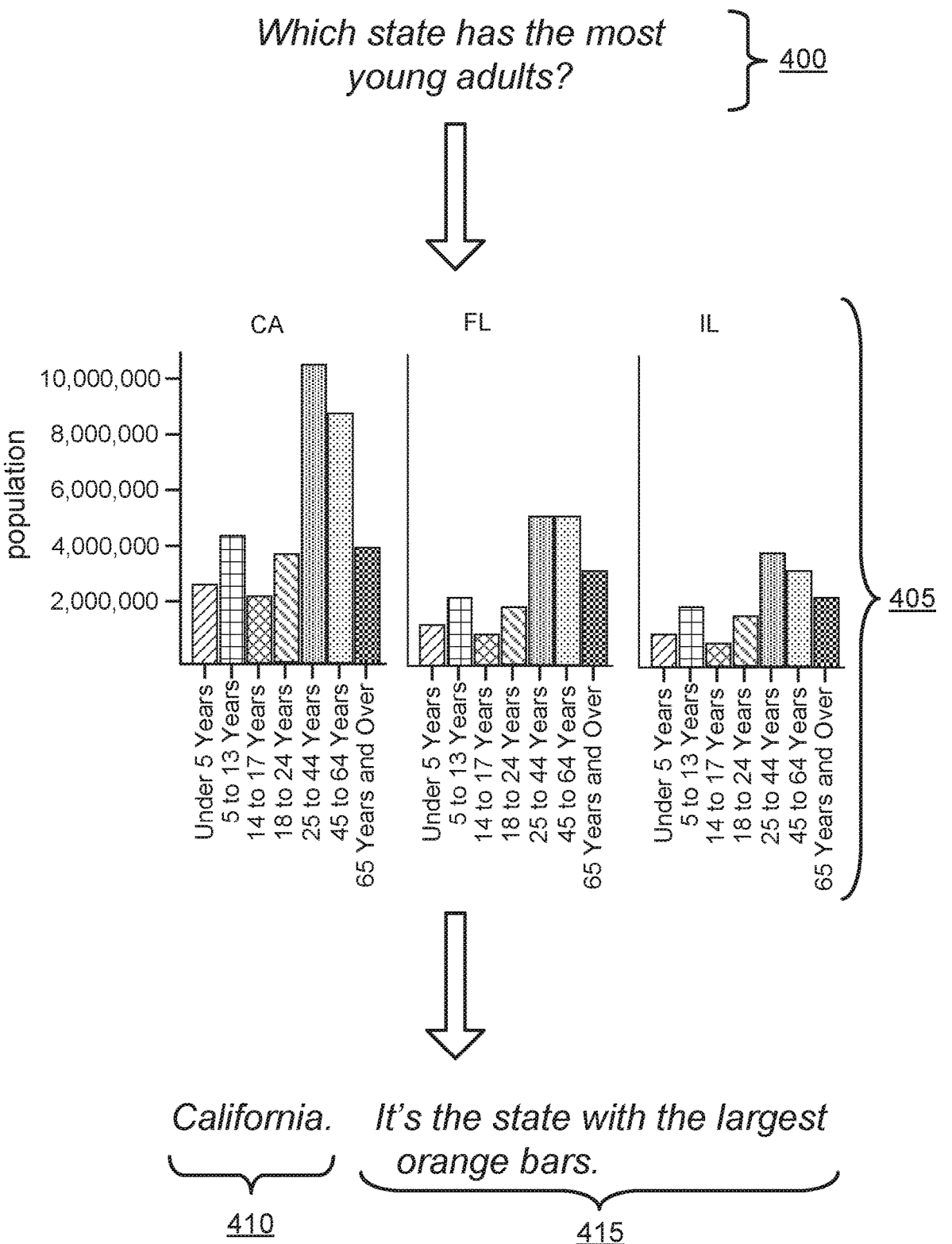
FIG. 4 shows an example of a question answering application according to aspects of the present disclosure.

In FIGS. 3-5, a method, apparatus, and non-transitory computer readable medium for question answering is described. One or more embodiments of the method, apparatus, and non-transitory computer readable medium include obtaining a chart and a query via a user interface; generating, by an answer model, an answer to the query based on the chart, wherein the answer model comprises a machine learning model trained based on chart data for the chart; generating, by a description model, a visual description based on the answer and the chart, wherein the description model comprises a machine learning model trained based on a chart specification for the chart; and transmitting, by a response component, a response to the query based on the answer and the visual description.

Some examples of the method, apparatus, and non-transitory computer readable medium further include predicting a plurality of probability values for candidate answers based on the query. Some examples further include selecting the answer based on the plurality of probability values.

In some embodiments, the query comprises a natural language query and the response comprises a natural language response. In some embodiments, the machine learning model is trained to perform a question answering task and a visual explanation generation task. In some embodiments, the chart data comprises domain facts related to the chart. In some embodiments, the chart specification indicates a correspondence between elements of the chart and visual properties of the chart.

FIG. 3 shows an example of a question answering process according to embodiments of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 305, the user provides a query and a chart. In some cases, the operations of this step refer to, or may be performed by, a user as described with reference to FIG. 1. For example, the chart is a bar chart that includes population data for two states, i.e., California and Florida. In some examples, the query from the user is a natural language query and is related to the chart. The user provides the query and the chart via a user interface. In the example shown in FIGS. 1 and 3, the bar chart includes population data on y-axis for different age groups in California (CA) and Florida (FL). For example, the ages on x-axis are segmented into seven categories, e.g., "Under 5 Years", "5 to 13 Years", "14 to 17 Years", "18 to 24 Years", "25 to 44 Years", "45 to 64 Years", and "65 Years and Over". At inference time, the query provided by the user to the natural language processing apparatus is "Which state has the most young adults?". In some cases, the query is an output from a rephrasing model of the NLP apparatus as shown in FIG. 2 where the query is a rephrased version that reads more natural.

At operation 310, the system encodes the query and the chart. In some cases, the operations of this step refer to, or may be performed by, a natural language processing apparatus as described with reference to FIGS. 1 and 2. The chart includes chart data and chart specification. The chart data refers to attributes or data displayed on the chart. The chart data includes domain facts obtained from the CSV file of the chart. Additionally, the chart specification (in JSON format) captures correspondence between different elements of the chart, e.g., a value on the x-axis of the chart for an attribute "population" on the y-axis is represented by orange bars. In some cases, a training component trains an answer model and a description model based on template sentences generated by template component.

The natural language processing apparatus can capture the symbolic relationships behind charts (e.g., the value "18-24 years" for the attribute "population segment" is represented by orange bars). Additionally, the natural language processing apparatus maps the "young adults" in the query to "18 to 24 Years" in the chart data (i.e., x-axis). Thus, the natural language processing apparatus can classify the "orange bars" in the bar chart as corresponding to "18 to 24 Years".

Additionally, the natural language processing apparatus can map "young adults" to "orange bars" and generate a visual explanation to the question, e.g., "CA. It's the state with the largest orange bars".

At operation 315, the system generates a response to the query based on query encoding and chart encoding. In some cases, the operations of this step refer to, or may be performed by, a natural language processing apparatus as described with reference to FIGS. 1 and 2. In some examples, the natural language processing apparatus includes an answer model and a description model. The answer model and the description model are language models. The response is generated based on the chart data and the chart specification.

At operation 320, the system displays the response. In some cases, the operations of this step refer to, or may be performed by, a user interface as described with reference to FIG. 1. The natural language processing apparatus displays the response to the user via the user interface. The response includes an answer to the query based on the chart and a visual description (or visual explanation) for the answer.

FIG. 4 shows an example of question answering application according to embodiments of the present disclosure. The example shown includes query 400, chart 405, answer 410, and visual description 415. The natural language processing apparatus, as described with reference to FIGS. 1-2, generates an answer and visual explanation in response to a query related to the chart. Chart 405 is an example of, or includes aspects of, the corresponding element described with reference to FIG. 7.

According to an embodiment of the present disclosure, a query and a chart are input to the natural language processing apparatus, which generates a response as output (i.e., an answer to the query and a description based on the answer and the chart). Query 400 is a natural language statement. The visual description generated by the natural language processing apparatus includes a natural language response. In some examples, chart 405 is a bar chart. The present disclosure is not limited to a bar chart, and the chart can be a line chart, pie chart, or the like.

According to some embodiments, natural language processing apparatus processes a chart based on the chart's context. Chart 405 provides information through representations that are visual (for relying on elements such as lines and bars) and symbolic (for associations to domain attributes). A chart specification is based on chart 405 to provide language models with chart-reading ability such that the machine learning model robustly understands language for chart-grounded question and answering. For example, the natural language processing apparatus takes query 400 ("Which state has the most young adults?") as input and generates answer 410 (California or "CA") and visual description 415 ("It's the state with the largest orange bars"). In some cases, the NLP apparatus can generate an answer, a visual description, or a combination of answer and visual description depending on user requests.

FIG. 5 shows an example of a method for natural language processing according to embodiments of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 505, the system obtains a chart and a query via a user interface. For example, the chart and the query are provided as input by the user. In some cases, the operations of this step refer to, or may be performed by, a user interface as described with reference to FIG. 1. In some examples, the chart is a bar chart and the query is a natural language query related to the chart. An example of the query is "Which state has the most young adults?".

At operation 510, the system generates, by an answer model, an answer to the query based on the chart, where the answer model includes a machine learning model trained based on chart data for the chart. In some cases, the operations of this step refer to, or may be performed by, an answer model as described with reference to FIGS. 2 and 8.

According to some embodiments of the present disclosure, the answer model is configured to generate an answer to the query based on the chart. The answer model processes the data related to the chart (e.g., chart data or domain facts) for answer generation. The answer model generates the answer based on the query and the chart. In some cases, a rephrasing model converts domain facts into natural language statements. For example, the answer model generates "California" or "CA" as an answer to the query based on the chart.

At operation 515, the system generates, by a description model, a visual description based on the answer and the chart, where the description model includes a machine learning model trained based on a chart specification for the chart. In some cases, the operations of this step refer to, or may be performed by, a description model as described with reference to FIGS. 2 and 8.

According to some embodiments, the description model computes visual explanation generation as a function of a chart's visual context (e.g., "visual context") and as a function of the question-answer pair for which a visual explanation is being requested. Visual contexts are converted into natural language statements and used by the description model to generate a visual description to the query. For example, the description model outputs "It's the state with the largest orange bars", which is a visual description to the query based on the answer ("California") and the chart. The answer is generated by the answer model at operation 510.

At operation 520, the system transmits, by a response component, a response to the query based on the answer and the visual description. In some cases, the operations of this step refer to, or may be performed by, a response component as described with reference to FIGS. 2 and 8. The response component transmits a response to the query, where the response includes the answer to the query and the visual description, e.g., "California. It's the state with the largest orange bars". Accordingly, a user knows that California is the state with the most young adults. Additionally or alternatively, the user can modify the query and the response component generates an updated response based on the modified query.

Training and Evaluation

In FIGS. 6-11, a method, apparatus, and non-transitory computer readable medium for natural language processing is described. One or more embodiments of the method, apparatus, and non-transitory computer readable medium include obtaining training data including a query about a chart and a ground-truth visual description of the chart corresponding to the query; generating a predicted visual description of the chart using a description model; and training the description model based on the predicted visual description and the ground-truth visual description.

Some examples of the method, apparatus, and non-transitory computer readable medium further include generating the ground-truth visual description based on a chart specification for the chart.

Some examples of the method, apparatus, and non-transitory computer readable medium further include generating a template description based on the chart specification, wherein the ground-truth visual description is generated based on the template description using a rephrasing model.

Some examples of the method, apparatus, and non-transitory computer readable medium further include generating first description model training data based on individual rows of the chart specification and second description model training data based on relationships between the chart specification and chart data for the chart. Some examples further include training the description model in a first phase based on the first description model training data and in a second phase based on the second description model training data.

Some examples of the method, apparatus, and non-transitory computer readable medium further include generating the query based on a chart specification and chart data for the chart.

Some examples of the method, apparatus, and non-transitory computer readable medium further include generating a template query based on an individual row of chart data for the chart and a query template, wherein the query comprises a rephrased version of the template query.

Some examples of the method, apparatus, and non-transitory computer readable medium further include identifying an answer to the query, wherein the predicted visual description is generated based on the answer.

Some examples of the method, apparatus, and non-transitory computer readable medium further include generating first answer model training data based on individual rows of chart data for the chart and second answer model training data based on relationships between the individual rows of the chart data. Some examples further include training an answer model to predict an answer to the query, wherein the answer model is trained in a first phase based on the first answer model training data and in a second phase based on the second answer model training data.

Some examples of the method, apparatus, and non-transitory computer readable medium further include generating a template query based on an individual row of the chart data and a query template. Some examples further include generating a rephrased query based on the template query using a rephrasing model, wherein the first answer model training data includes the rephrased query.

Figure 6:
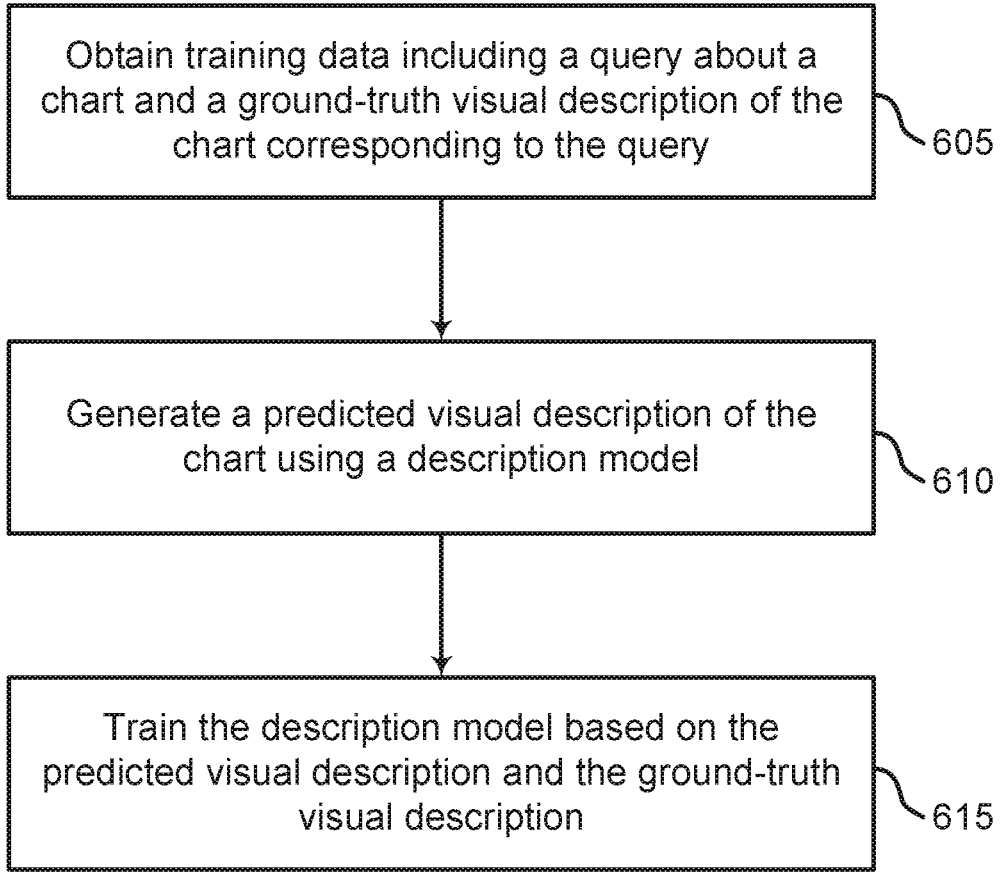
FIG. 6 shows an example of a method for training a description model according to aspects of the present disclosure.

FIG. 6 shows an example of a method for training a description model according to embodiments of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 605, the system obtains training data including a query about a chart and a ground-truth visual description of the chart corresponding to the query. In some cases, the operations of this step refer to, or may be performed by, a training component as described with reference to FIG. 2. Training dataset includes questions on a given chart and a corresponding visual description for each of the questions. In some cases, a ground-truth answer is used to generate the ground-truth visual description when training a language model.

According to some embodiments, a language model is used in a "closed-book exam" manner to extend the language model's underlying knowledge with chart-related information before performing an end task. In some embodiments, the arrow notation ($\rightarrow$) is used to visually denote the input-output pairs given to a language model, with the input prompt to the left of the arrow notation and output (or completion) to the right of the arrow notation. In some embodiments, a notation $LM_{step}$ is used to denote the order in which fine-tuning is performed, such that language models have the knowledge required to perform an end task in parameters of language models.

At operation 610, the system generates a predicted visual description of the chart using a description model. In some cases, the operations of this step refer to, or may be performed by, a description model as described with reference to FIGS. 2 and 8.

According to some embodiments, the description model generates a visual explanation based on chart specifications that refer to the relationship between elements of the chart and visual properties of the chart. In some cases, the visual properties are converted into natural language statements and used by the description model to provide a visual description to a query. For example, the description model generates a visual description to the query based on the answer and the chart.

According to some embodiments, the description model computes visual explanation generation as a function of a chart's visual context (e.g., "visual context") and as a function of the question-answer pair for which a visual explanation is being requested. In some cases, visual contexts, originally stored as JSON chart specifications, are converted into natural language statements using the templates, e.g., "visual_encoding$_1$ represents$\rightarrow$attribute$_1$" and "visual encoding$_2$ represents$\rightarrow$value$_{11}$."

The arrow notation ($\rightarrow$) visually denotes the input-output pairs given to a language model. The input prompt is on the lefthand side of the arrow notation and output (or completion) is on the righthand side of the arrow notation. Questions, answers, and explanations (denoted as "Q", "A", and "E", respectively) are transformed using a similar template: "Q: For which attribute$_1$ is the value for y$_{attribute}$ the highest when attribute$_2$ is value$_{21}$?A: value$_{11}$. E:$\rightarrow$It's the attribute$_1$ with the largest/smallest visual_encoding$_1$." In some cases, VC and VEG represent the visual context and visual explanation generation training sets, respectively. In some cases, visual explanation generation is represented as $LM_1(VC)$ followed by $LM_2(VEG)$.

According to some embodiments, training component trains an encoder-decoder language model (e.g., T5, GPT-2, GPT-3) under a "closed-book exam" assumption. According to the closed-book exam assumption, encoder-decoder language models can be fine-tuned in two sequential steps. First, the language model is trained on base facts such that the language model can store custom knowledge in its parameters. Second, the language model is trained on an end-task that implicitly depends on the custom knowledge, e.g., similar to a closed-book exam setting. For example, considering that the "$\rightarrow$" symbol separates prompts (left of the arrow) from completions (right of the arrow), language models can be first fine-tuned on facts such as "Adobe was founded in$\rightarrow$1986" and "Snapchat was founded in$\rightarrow$2011," and then fine-tuned on questions such as "Which company was founded first, Adobe or Snapchat? The answer is$\rightarrow$Adobe". This is an example of compositional reasoning that LMs can perform, with the advantage that the resulting model (e.g., natural language processing apparatus) still preserves some robustness against natural language variation. A natural language variation is a characteristic that is acquired through initial pretraining of the language model on a large corpora.

At operation 615, the system trains the description model based on the predicted visual description and the ground-truth visual description. In some cases, the operations of this step refer to, or may be performed by, a training component as described with reference to FIG. 2. The training of second task takes a query and the corresponding ground-truth answer as input and generates the ground-truth description as output. In some cases, training loss is referred to as cross-entropy at the token level, which is a standard loss used for language models. Accordingly, the two models ("answer model" for end-first task and "description" model for end-second task) generate the ground-truth outputs (i.e., correct answers and descriptions, respectively) token by token, thereby maximizing the probabilities.

The order of a training phase refers to the order of a particular set of examples within the training dataset. For example, if the order of "Adobe was founded in$\rightarrow$1986" and "Snapchat was founded in$\rightarrow$2011" is 1, and the order of "Which company was founded first, Adobe or Snapchat? The answer is$\rightarrow$Adobe." is 2, this means that the former examples (e.g., statement with order 1) come first in the training data. In some examples, for a first task and a second task, the training component fine-tunes a language model for 5 epochs with a standard learning rate of $10^{-4}$, and with maximum prompt and completion lengths (in number of tokens) of 256 and 128, respectively in first task and second task. In some examples, the base language model is GPT-3 DaVinci (with approximately 175 billion parameters).

The number of epochs is kept low to avoid "catastrophic forgetting". Catastrophic forgetting occurs when the language model overfits to the fine-tuning data and loses ("forgets") the flexibility acquired from initial pretraining of the language model. After fine-tuning, the language model from the epoch with minimal validation error is selected.

Figure 7:
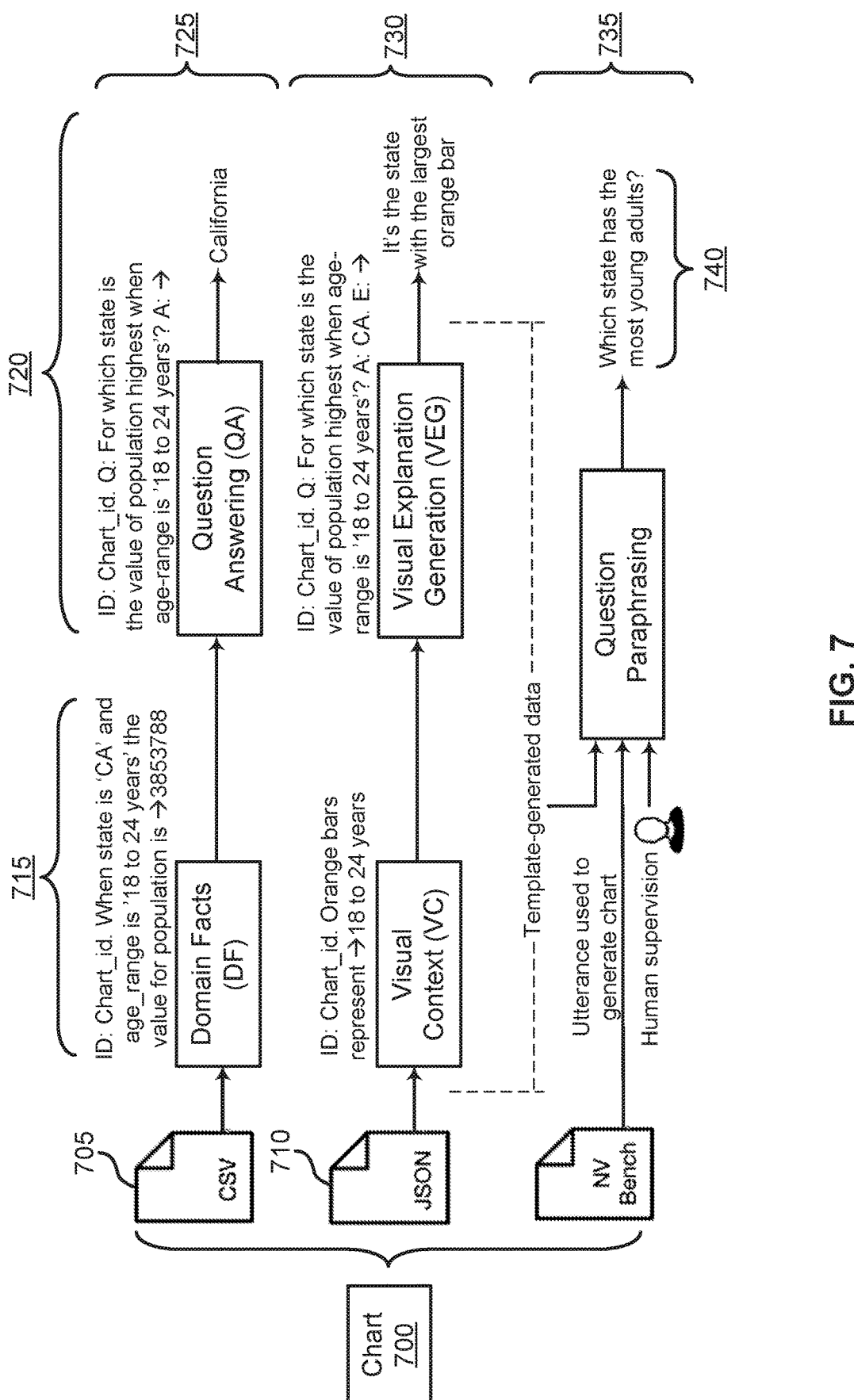
FIG. 7 shows an example of a method for training a machine learning model according to aspects of the present disclosure.

FIG. 7 shows an example of training a machine learning model according to embodiments of the present disclosure. The example shown includes chart 700, chart data 705, chart specification 710, first phase 715, second phase 720, first task 725, second task 730, third task 735, and rephrased query 740. Chart 700 is an example of, or includes aspects of, the corresponding element described with reference to FIG. 4.

According to some embodiments of the present disclosure, chart 700 includes or is transformed to chart data 705 and chart specification 710. In some cases, the natural language processing apparatus creates a dataset based on a chart for training or implementing language model based CQA tasks. For example, chart 700 may be a bar chart, pie chart, etc.

In some cases, human-generated questions about bar charts are related to distributional aspects of the quantitative attribute. Thus, questions related to a bar chart include minimum and maximum values across visual elements of a same color and minimum and maximum values within a chart panel.

Among conventional datasets, no single dataset has the characteristics needed to implement CQA based on language models. For example, VisQA relates to CQA and has the benefit of collecting naturally arising questions. However, VisQA is very small for language model fine-tuning. In some examples, NVBench is rich in scale and domain diversity but does not relate to CQA. By utilizing the benefits of the two conventional datasets, the natural language processing apparatus creates a new dataset for training or implementing language model based CQA.

As shown in FIG. 7, CSV file 705 stores the domain facts (DF) depicted in a chart. In some cases, the file includes visually encoding domain facts of a chart (typically in JSON format 710) and visual context. Additionally, a chart specification includes both domain facts and visual context. According to some embodiments, the data contained in a chart specification (e.g., raw data, metadata) is transformed into natural language statements (statements) before the data can be utilized by a language model (an answer model, a description model, a rephrasing model). In some examples, the statements are generated via pre-defined templates and are referred to as template-generated statements.

In some examples, the chart files (the CSV file containing the chart data or the JSON file representing the chart specification) are transformed into natural language statements via templates. This step is optional. In some cases, chart files are input to the language model without the transformation step. Further details regarding chart visual context are described with reference to FIG. 9. Further details regarding chart domain facts are described with reference to FIG. 10.

Referring to FIG. 7, first task 725 includes chart-grounded question answering (Chart Q&A), in which the objective of first task 725 is to answer chart-related questions; second task 730 includes explanation generation (e.g., visual explanation generation), in which the objective of second task 730 is to explain in terms of a chart's visual elements, how an answer is extracted; and third task 735 includes natural rephrasing, in which the rephrasing model paraphrases template-generated statements to increase the robustness of first task 725 and second task 730.

According to some embodiments, training component trains encoder-decoder language models under a "closed-book exam" assumption. In some cases, the language model is trained on base facts such that the language model can store custom knowledge in its parameters. Additionally, the language model is trained on an end-task that implicitly depends on the custom knowledge similar to a closed-book exam setting. As described herein, the "→" symbol separates prompts (left of the arrow) from completions (right of the arrow).

According to some embodiments, first task 725 relates to generating an answer and second task 730 relates to generating a description. For each of first task and second task, training includes a first phase 715 and a second phrase 720. The term "phase" refers to sequential breakdown of each end-task for training a machine learning model. For example, consider the "closed-book exam" assumption, the machine learning model first "reads the book" for first task, and then learns to "take the exam" of first task. Similarly, the machine learning model first "reads the book" for second task, and then learns to "take the exam" of second task.

In an embodiment, first task 725 includes fine-tuning the machine learning model on the domain facts (first phase 715 of the first task) and then fine-tuning the machine learning model to generate the answer given an input query (second phase 720 of the first task). In some cases, first phase 715 of the first task includes learning the domain facts extracted from the chart's underlying data (a CSV file). The answer model is exposed to and stores the facts before learning to answer questions.

In an embodiment, second task 730 includes fine-tuning the machine learning model on the visual contexts (first phase 715, end-second task), then fine-tuning the machine learning model to generate the description given a query and the corresponding answer as inputs (second phase 720 of the second task). In some cases, first phase 715 of the second task includes learning the visual context extracted from the chart specification (e.g., JSON file).

As an example shown in FIG. 7, language models are first fine-tuned on facts such as "When state is 'CA' and age_range is '18 to 24 years' the value of population is→3853788" and "Orange bars represent→18 to 24 years" at first phase 715. The language model is fine-tuned on rows in the CSV file, i.e., the entire domain data shown on the chart. In some cases, the loss function used is the standard loss function for language modeling, e.g., cross-entropy at the token level. The model maximizes the probability of the token(s) in the ground-truth answer (e.g., "3853788") vs. other tokens not in the ground-truth, conditioned on the given input (e.g., "When state is 'CA' and age_range is '18 to 24 Years Old' the value for population is"). The model memorizes the visual-semantic relationships that are shown on the chart, thus preparing the model for second phase 720.

The language model is fine-tuned on a question such as "For which state is the value for population highest when age_range is '18 to 24 years'? The answer is→California" and "For which state is the value for population highest when age_range is '18 to 24 years'? The answer is→CA and explanation is→It's the state with the largest orange bar" at second phase 720. While learning to predict the ground-truth answer ("CA") conditioned on the given input ("Question: For which state is the value for population highest when age_range is '18 to 24 Years Old'? Answer:"), the model uses the facts learned during first phase 715. For example, the machine learning model stores and recalls the related facts read on a book (the "closed-book exam" assumption).

In an embodiment, the rephrasing model paraphrases a question at third task 735. Question paraphrasing relates to converting template-generated statements that are unnatural to statements that are natural. For example, "For which state is the value for population the highest when segment is 18 to 24 years?" and "Which state has the most young adults?" share the same meaning. The second query (or statement) is more natural compared to the first query.

The rephrasing model is configured to paraphrase the template-generated questions more naturally while preserving the meaning of the template-generated questions. The rephrasing model models this task as a function of a given template-generated question ($q_{temp}$). Referring to FIG. 7, the rephrasing model is configured to model third task 735 as a function of the utterance used in NVBench to create the chart ($c_{desc}$). This way, the language model remains semantically grounded on the chart domain. In some cases, question paraphrasing is represented as "$c_{desc} \cdot q_{temp}$. Rephrase it more naturally:→$q_{nat}$," where $q_{nat}$ is the naturally rephrased question. The language model is pre-trained on a large corpora.

At the end of second phase 720, at inference time, the machine learning model takes an unseen input (e.g., "Question: Which state has the most young adults? Answer:") and applies the same logic learned during second phase 720 to generate the answer (e.g., "CA"). The answer model, at inference time, can generate "California" instead of "CA"— which is the phrasing seen during training. The description model remains robust to such variations. Accordingly, the natural language processing apparatus preserves robustness dealing with natural language variations.

Figure 8:
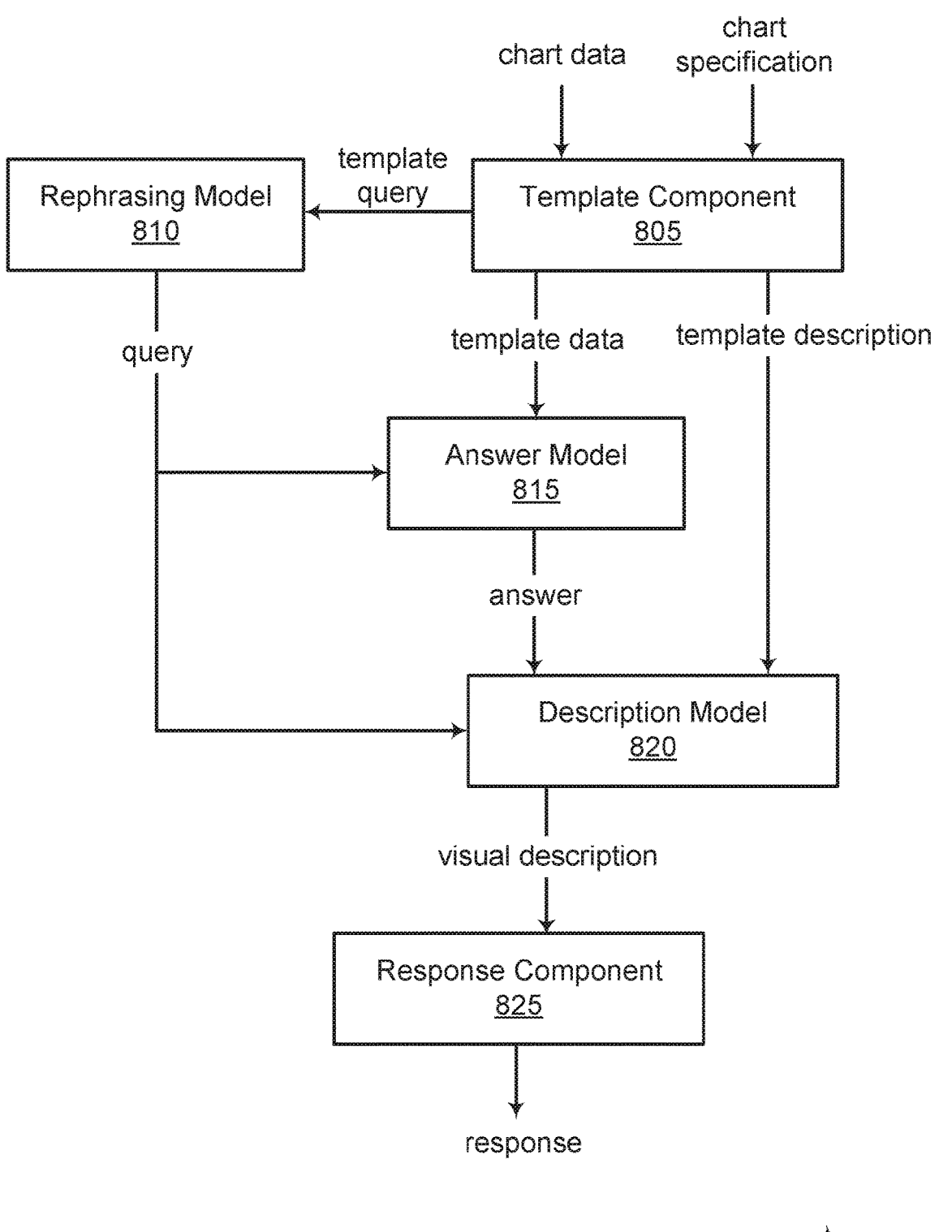
FIG. 8 shows an example of a natural language processing network according to aspects of the present disclosure.

FIG. 8 shows an example of a natural language processing network according to embodiments of the present disclosure. The example shown includes machine learning model 800, template component 805, rephrasing model 810, answer model 815, description model 820, and response component 825. In an embodiment, machine learning model 800 includes template component 805, rephrasing model 810, answer model 815, description model 820, and response component 825. In some embodiments, answer model 815 and description model 820 are separate language models. In some embodiments, answer model 815 and description model 820 are a single language model but trained for different tasks (e.g., question and answering, visual explanation generation).

According to some embodiments of the present disclosure, a query includes a natural language query and a response includes a natural language response. Machine learning model 800 is trained to perform a question answering task and a visual explanation generation task. In some examples, chart data includes domain facts related to a chart. Chart specification includes or indicates correspondences between chart elements and visual properties of the chart.

According to some embodiments, a query and a chart are input to machine learning model 800 via a user interface. In some cases, the chart and the query may be provided by a user. In some cases, the query is a modified output from a rephrasing model. According to an embodiment, machine learning model 800 generates the query based on a chart specification and chart data for the chart.

As shown in FIG. 8, the chart data and the chart specification are input to template component 805. Template component 805 is an example of, or includes aspects of, the corresponding element described with reference to FIG. 2. Template component 805 generates a template query, template data, and template description corresponding to the chart information. In some cases, template component 805 generates template query, template data, and template description based on the chart data and the chart specification. For example, the template component generates a template query "for which state is the value for population the highest when segment is 18-24 years?" Further details regarding template query, template data, and template description generated by the template component are described with reference to FIGS. 7 and 11.

In some cases, the template query is input to rephrasing model 810. Rephrasing model 810 rephrases the template query to a natural language statement that is more natural compared to the template query while preserving the meaning of the template query. The template query is a template-generated question. The system models this task as a function of a given template-generated question $(q_{temp})$. For example, rephrasing model 810 rephrases the template query→$q_{nat}$," where $q_{nat}$ is the naturally rephrased question. In some examples, the naturally rephrased question is referred to as a query. Question paraphrasing process converts template-generated statements to natural language statements that read more natural.

In an example, "for which state is the value for population the highest when segment is 18-24 years?" and "which state has the most young adults?" have the same meaning. The second statement (or query) reads more natural compared to the first query. Rephrasing model 810 models the paraphrasing task as a function of a given template-generated question $(q_{temp})$.

Additionally, to make the language model remain semantically grounded on the chart domain, rephrasing model 810 models this task as a function of the utterance used in NVBench to create the chart $(c_{desc})$. Further details regarding paraphrasing are described with reference to the third task in FIGS. 7 and 11. Rephrasing model 810 is an example of, or includes aspects of, the corresponding element described with reference to FIG. 2.

According to some embodiments, template component 805 also generates template data that is provided to answer model 815. Answer model 815 is configured to model question-answering as a function of the chart data (e.g., domain facts) and as a function of the query. Answer model 815 generates an answer based on the domain facts and on the query. Answer model 815 is an example of, or includes aspects of, the corresponding element described with reference to FIG. 2. The answer can be output to the user.

Description model 820 computes visual explanation generation as a function of a chart's visual context (e.g., "visual context") and as a function of the question-answer pair for which a visual explanation is being requested. Accordingly, description model 820 generates a visual description based on the template description related to visual context and the answer from answer model 815. Description model 820 is an example of, or includes aspects of, the corresponding element described with reference to FIG. 2.

According to some embodiments, the answer model and the description model are used sequentially at inference time. First, answer model 815 generates the answer for a given input query (e.g., input: "( . . . ) Which state has the most young adults?"; output: "California"). Next, description model 820 generates the description/explanation for an input that includes both a query and its answer (e.g., input: "( . . . ) Which state has the most young adults? California"; output: "It's the state with the largest orange bars").

In an embodiment, the visual description is then input to response component 825 to generate a response. Accordingly, response component 825 transmits a response to the query based on the answer and the visual description. In some cases, the response is then transmitted to users via a user interface. Response component 825 is an example of, or includes aspects of, the corresponding element described with reference to FIG. 2.

FIG. 9 shows an example of a method for two-phase training of a description model according to embodiments of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system generates the ground-truth visual description based on a chart specification for the chart. In some cases, the operations of this step refer to, or may be performed by, a training component as described with reference to FIG. 2. In some cases, a ground-truth answer is used to generate the ground-truth visual description during training.

At operation 910, the system generates first description model training data based on individual rows of the chart specification and second description model training data based on relationships between the chart specification and chart data for the chart. In some cases, the operations of this step refer to, or may be performed by, a training component as described with reference to FIG. 2.

The natural language processing apparatus creates training data in which LM-based CQA can be studied. In some cases, bar charts with one quantitative attribute on the y-axis and two categorical attributes, which are generated from VisQA dataset, ensure at least a minimum diversity of visual elements. In some examples, NVBench includes 359 bar charts of similar type as bar charts from VisQA, with an average of 3.94 colored bars per chart and spanning 105 domains. In some examples, templates can be used on multiple bar charts to generate the sets of statements for the natural language processing apparatus.

Seme examples use templates on 359 bar charts in NVBench that are of similar type as bar charts from VisQA with an average of 3.94 colored bars per chart and spanning 105 domains are used. For example, templates are applied to 359 bar charts from NVBench to generate sets of statements for the natural language processing apparatus. In some examples, the templates include 9,885 domain facts (DF), 7,310 question-answer pairs (QA), 3,989 visual context statements (VC), and 7,310 question-answer-explanation triples (VEG).

At operation 915, the system trains the description model in a first phase based on the first description model training data. In some cases, the operations of this step refer to, or may be performed by, a training component as described with reference to FIG. 2. The description model is trained to interpret a chart based on a chart specification of the chart. The description model is trained on a second task, which is visual description generation (e.g., visual description generation stating "California is the state with the largest orange bars").

In the first phase, the JSON file is transformed into input-output pairs. For example, a model input is "Orange bars represent" and a model output: "18 to 24 Years". The input-output pairs cover the rows in the JSON file. The loss function is cross-entropy at the token level. This means that the description model is trained to maximize the probability of the token(s) in the ground-truth answer (e.g., "18 to 24 Years") versus other tokens not in the ground-truth answer, conditioned on the given input (e.g., "Orange bars represent"). The description model stores visual-semantic relationships that are shown on the chart, preparing it for the second phase.

At operation 920, the system trains the description model in a second phase based on the second description model training data. In some cases, the operations of this step refer to, or may be performed by, a training component as described with reference to FIG. 2. In some cases, the first phase and the second phase are further described with reference to FIG. 7. The "relationships" (relationships between the chart specification and chart data for the chart) in the second training phase are used to describe an input query-answer pair.

Moving to the second phase, following input-output pair is used to train the description model. For example, a model input is "Question: For which state is the value for population highest when age_range is 18 to 24 Years? Answer: CA. Explanation:" A model output is "It's the state with the largest orange bars." By the end of the second phase and at inference time, the description model takes a completely unseen input (e.g., "Question: Which state has the most young adults? Answer: California. Explanation:") and applies the same logic it has learned during the second phase to arrive at the description (e.g., "It's the state with the largest orange bars.")

The answer model, at inference time, can generate "California" instead of "CA"—"CA" is the phrase seen during training—and the description model remains robust to these variations. Following notations are used to express the input and output given to a model during training. The input is always to the left of a right arrow ($\rightarrow$), while the output is to the right of it. For example, "Orange bars represent$\rightarrow$18 to 24 Years" is equivalent to the first input-output pair above.

According to some embodiments, the explanation generation task is modeled as follows. First, an explanation depends on the visual context and on the question-answer pair. Second, the template component applies a template to transform visual contexts into statements. For example, the prompt is represented as: "Context: <chart_id$_1$>. <attribute$_1$> is represented by" and the completion is represented as: "<visual_element$_1$>". A full set of statements related to visual contexts is referred to as VC.

The training component organizes question-answer-explanation triples as statements. For example, the prompt is organized as: "Context: <chart_id$_1$>. Question: Which state has the most young adults? Answer: California. Explanation:" and the completion (or visual explanation output) is: "It's the state with the largest orange bars." The full set of statements related to question-answer-explanation triples is referred to as VEG.

According to some embodiments, fine-tuning the description model involves two phases, i.e., LM$_1$(VC) and LM$_2$ (VEG). LM$_1$(VC) represents fine-tuning the description model based on the statements from VC. LM$_2$(VEG) represents fine-tuning description model based on the statements from VEG. The training component fine-tunes the description model based on the entire VC set. Additionally or alternatively, subsets of VEG can be held-out for testing.

According to an embodiment, the natural language processing apparatus includes a single language model fine-tuned on two tasks, i.e., first task (question and answering) and second task (visual explanation generation). The single language model is trained on two objectives, e.g., generating an answer to a query and generating visual explanations based on the answer. That is, machine learning model 800 shown in FIG. 8 is configured to perform the question answering task and the visual explanation task.

FIG. 10 shows an example of a method for two-phase training of an answering model according to embodiments of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1005, the system generates first answer model training data based on individual rows of chart data for the chart and second answer model training data based on relationships between the individual rows of the chart data. In some cases, the operations of this step refer to, or may be performed by, a training component as described with reference to FIG. 2.

Training data is obtained for language model based CQA. In some cases, bar charts with one quantitative attribute on the y-axis and two categorical attributes ensure at least a minimum diversity of visual elements. Human-generated questions about bar charts are related to distributional aspects of the quantitative attribute. Accordingly, the training data includes questions about minimum and maximum values across visual elements of a same color and questions about minimum and maximum values within a chart panel. In some examples, templates on bar charts in NVBench similar to VisQA are used. One example includes templates on the 359 bar charts from NVBench to generate sets of statements for training the answer model or the description model. The answer model and the description model are language models.

At operation 1010, the system trains an answer model to predict an answer to the query. In some cases, the operations of this step refer to, or may be performed by, a training component as described with reference to FIG. 2.

According to some embodiments, the answer model is configured to generate an answer to the query. In some cases, the answer model computes question-answering based on domain facts stored in CSV format that are converted into natural language statements using templates. For example, a template can be "When attribute$_1$ is value$_{11}$ and attribute$_2$ is value$_{21}$, the value for y$_{attribute}$ is →value$_{y1}$." Questions and answers are transformed using a similar template, e.g., "Q: For which attribute$_1$ is the value for y$_{attribute}$ the highest when attribute$_2$ is value$_{21}$? A: value$_{11}$." In some cases, DF and QA represent the domain facts and question-answering training sets, respectively. The answer model is trained on a first task, which is chart-grounded question-answering. A question answering training example is "Which state has the largest population between 18 and 24 years old? California".

At operation 1015, the system trains the answer model in a first phase based on the first answer model training data. In some cases, the operations of this step refer to, or may be performed by, a training component as described with reference to FIG. 2.

In the first phase, the answer model is trained to learn the domain facts extracted from the chart's underlying data (e.g., a CSV file). The answer model learns these facts before it can learn to answer questions. The CSV file is transformed into an input-output pair, for example, a model input is "When state is 'CA' and age_range is '18 to 24 Years Old' the value for population is". A model output is "3853788". Similarly, the training component searches and transforms other rows in the CSV file, i.e., the entire domain data shown on the chart is covered at training. The loss function here is a cross-entropy at the token level. This means that the answer model is trained to maximize the probability of the token(s) in the ground-truth answer (e.g., "3853788") versus other tokens not in the ground-truth, conditioned on the given input (e.g., "When state is 'CA' and age_range is '18 to 24 Years Old' the value for population is").

At operation 1020, the system trains the answer model in a second phase based on the second answer model training data. In some cases, the operations of this step refer to, or may be performed by, a training component as described with reference to FIG. 2. The first phase and the second phase are further described with reference to FIG. 7. The "relationships" (relationships between the individual rows of the chart data) in the second training phase are used to answer an input query.

Moving to the second phase, the following input-output pair is used to train the answer model. For example, a model input is "Question: For which state is the value for population highest when age_range is '18 to 24 Years Old'? Answer:" A model output is "CA". While learning to predict the ground-truth answer ("CA") conditioned on the given input ("Question: For which state is the value for population highest when age_range is '18 to 24 Years Old'? Answer:"), the answer model relies on and makes use of the facts it learned during the first phase. The standard loss function for training a language model is used.

By the end of the second phase and at inference time, the answer model takes a completely unseen input (e.g., "Question: Which state has the most young adults? Answer:") and apply the same logic it has learned during the second phase to arrive at the answer (e.g., "CA").

The answer model is configured to generate an answer to the query based on the first and second answer model training data. In some cases, the answer model computes question-answering based on domain facts (e.g., CSV format) that are converted into natural language statements using templates.

According to some embodiments, the chart question answering task is modeled as follows. An encoder-decoder language model is trained on input-output pairs made of a prompt (e.g., input) and a ground-truth completion (e.g., output). An answer depends on the domain facts and on the question being asked, in case of chart question answering. The template component applies a template to transform domain facts into statements including a prompt and a completion. As an example, the prompt is: "Context: <chart_id$_1$>. When <attribute$_1$> is <value$_1$> and <attribute$_2$> is <value$_2$>, the value for <attribute$_{y\text{-}axis}$> is" and the completion is "<value$_y$>". In some cases, a full set of statements related to domain facts is denoted as DF. The training component organizes question-answer pairs as statements with a prompt and a completion. For example, the prompt is: "Context: <chart_id$_1$>. Question: Which state has the most young adults? Answer:" and the completion is: "California". In some cases, the full set of statements related to question-answer pairs is denoted as QA.

According to some embodiments, fine-tuning the answer model involves two phases, i.e., LM$_1$(DF) and LM$_2$(QA). LM represents a language model (answer model). In some cases, LM$_{order}$ represents the order in which a training phase happens. LM$_1$(DF) represents fine-tuning the language model on the statements from domain facts (DF). LM$_2$(QA) represents fine-tuning the language model on the statements from question answering (QA). As a result, question-answering is represented as LM$_1$(DF) followed by LM$_2$(QA). The answer model is fine-tuned on the entire domain facts (DF) set. Additionally or alternatively, subsets of QA can be held-out for testing.

The natural language processing apparatus is trained for question-answering and visual explanation generation. In some examples, the first fine-tuning step (LM$_1$) includes 100% of the data available, i.e., LM$_1$(DF) comprises 100% of domain facts (DF) while LM$_1$(VC) comprises 100% of visual context statements (VC). At the second fine-tuning step (LM$_2$), 10% of the data are reserved for testing. That is, LM$_2$(QA) comprises 90% of QA for question-answering whereas LM$_2$(VEG) comprises 90% of VEG for visual explanation generation.

Figure 11:
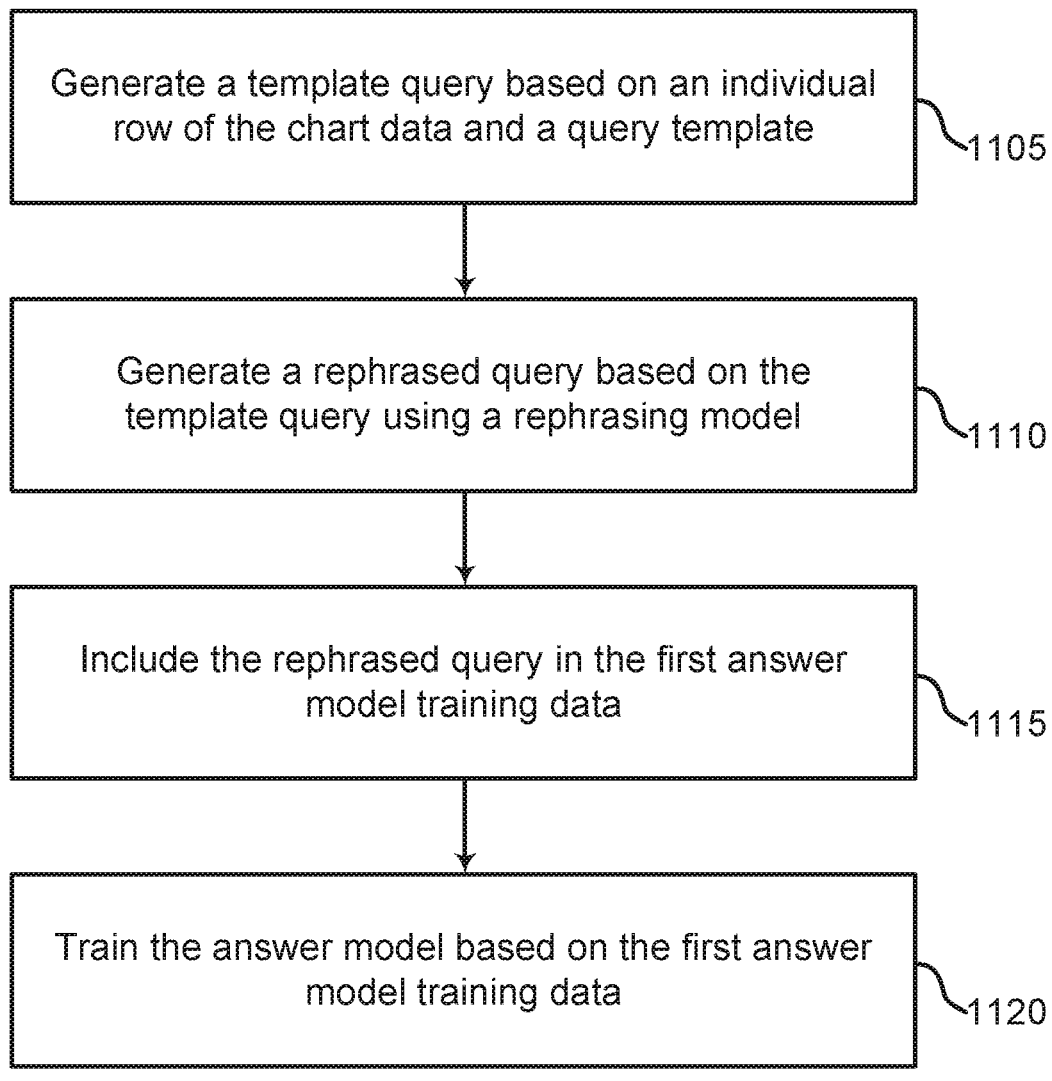
FIG. 11 shows an example of a method for training an answer model based on a rephrased query according to aspects of the present disclosure.

FIG. 11 shows an example of a method for training an answer model based on a rephrased query according to embodiments of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1105, the system generates a template query based on an individual row of the chart data and a query template. In some cases, the operations of this step refer to, or may be performed by, a template component as described with reference to FIGS. 2 and 8. Questions are part of the prompt in both QA and VEG. According to an example, 6,700 template-generated questions are seen during training that are referred to as $$Q_{temp}^{train}$$

and 610 held-out questions are referred to as $$Q_{temp}^{test},$$

which are used for an initial, more controlled evaluation.

In some examples, query templates are used on multiple bar charts to generate the sets of statements. One example includes using template queries on 359 bar charts from NVBench to generate sets of statements which include 9,885 domain facts (DF), 7,310 question-answer pairs (QA), 3,989 visual context statements (VC), and 7,310 question-answer-explanation triples (VEG).

At operation 1110, the system generates a rephrased query based on the template query using a rephrasing model. In some cases, the operations of this step refer to, or may be performed by, a rephrasing model as described with reference to FIGS. 2 and 8. The language model is trained on a third task, which is natural rephrasing. The language model can generate variations of a query, e.g., a rephrased version of a template query.

In an embodiment, raw data is obtained from the chart. A fixed template is applied (e.g., "For which [attribute_1] is the value for [target_attribute] highest when [attribute_2] is [attribute_2_value]?") to generate queries from the raw data (e.g., "For which state is the value for population highest when age_range is 18 to 24 Years?"). These queries are called "template-based queries" or "template queries". Then the template-based queries are input to GPT-3 to generate a more natural rephrasing (e.g., "Which state has the most young adults?"). The more natural rephrasing is referred to as a "rephrased query".

For example, a template query is "For which state is the value for population the highest when segment is 18-24 years?" The template query is transformed to a rephrased version of the template query "Which state has the most young adults?". The rephrased version is more natural compared to the template query.

According to an embodiment, a natural rephrasing task is modeled as follows. First, a language model is selected as the rephrasing model by minimal pretraining error among the available language models. In some cases, the pretraining error is inversely proportional to the number of parameters in language models. Second, a naturally rephrased statement depends on the template-generated statement and a natural language description of the chart.

In some examples, natural language queries can be a form of natural language description. A training sample is organized as follows, in which completions are manually annotated. For example, the prompt is annotated as: "Context: <chart_description₁>. Question: In which State is the value for 18 to 24 Years the lowest? Rephrase the question more naturally:" and the completion is annotated as: "Which state has the most young adults?".

In some cases, the training component fine-tunes the rephrasing model based on the full set of manually annotated examples. To perform natural rephrasing for data augmentation, the fine-tuned rephrasing model is applied on the other examples that do not have annotations. According to some embodiments, fine-tuned language models are used to generate language through greedy decoding, based on which the most probable token is selected at each generation step.

In some cases, greedy decoding refers to a sequence-to-sequence algorithm used for language generation task in the field of NLP. Greedy decoding generates the sequence outputs of tokens from a machine learning model. The model maps an input sequence to a target sequence. An encoder accepts the input sequence of tokens and a decoder generates the output sequence for a maximum number of tokens in the sequence. Each probability of the decoder output is conditional of the previous token outputs. Greedy decoding includes selecting the token with the highest conditional probability from the vocabulary.

Further, at operation 1115, the system includes the rephrased query in the first answer model training data. In some cases, the operations of this step refer to, or may be performed by, a training component as described with reference to FIG. 2.

In some cases, $$Q_{temp}^{test}$$

is manually rephrased to produce a human-generated test set $$Q_{nat}^{test},$$

which are used for a more realistic evaluation. When evaluating on $$Q_{nat}^{test},$$

an objective is to test the robustness of the language model-based method. In some embodiments, language models are fine-tuned exclusively on $$Q_{temp}^{train}$$

with template-generated questions. In some cases, a robust language model has the performance on $$Q_{nat}^{test} \approx Q_{temp}^{test}.$$

A language model is considered robust in case of a slight performance loss (e.g., performance on $$Q_{nat}^{test} < Q_{temp}^{test}$$

and is able to recover with some additional data from the distribution of $$Q_{nat}^{test}.$$

Accordingly, the present disclosure applies question paraphrasing on $$Q_{temp}^{train}$$

to produce $$Q_{nat}^{train}$$

with more naturally phrased questions, so that the natural language processing apparatus can progressively augment initial LMs with parts of $$Q_{nat}^{train}$$

while measuring performance on $$Q_{nat}^{test}.$$

According to an exemplary embodiment, the following training set is used to fine-tune GPT-3 DaVinci for question paraphrasing: considering the formulation "$c_{desc} \cdot q_{temp}$. Rephrase it more naturally: $\rightarrow q_{nat}$," $q_{temp}$ and $q_{nat}$ are populated with $$Q_{temp}^{test} \text{ and } Q_{nat}^{test}$$

respectively. Additionally, $d_{desc}$ is retrieved from the corresponding charts in NVBench. Next, the rephrasing model applies the resulting language model to the questions in $$Q_{temp}^{train}$$

with a decoding temperature=0.7, top P=1.0, and maximum sequence length=40, and the rephrasing model generates $$Q_{nat}^{train}.$$

In some cases, human judges are used to evaluate the quality of the approach for automatic question paraphrasing.

At operation 1120, the system trains the answer model based on the first answer model training data. In some cases, the operations of this step refer to, or may be performed by, a training component as described with reference to FIG. 2. The answer model is configured to generate an answer to the query based on the first answer model training data. The answer model generates an answer to the query based on domain facts (e.g., stored in CSV format) that are converted into a rephrased query.

FIG. 12 shows an example of a computing device 1200 according to embodiments of the present disclosure. The example shown includes computing device 1200, processor 1205, memory subsystem 1210, communication interface 1215, I/O interface 1220, user interface component 1225, and channel 1230.

In some embodiments, computing device 1200 is an example of, or includes embodiments of, natural language processing apparatus 200 of FIG. 2. In some embodiments, computing device 1200 includes one or more processors 1205 that can execute instructions stored in memory subsystem 1210 for obtaining a chart and a query via a user interface; generating, by an answer model, an answer to the query based on the chart, wherein the answer model comprises a machine learning model trained based on chart data for the chart; generating, by a description model, a visual description based on the answer and the chart, wherein the description model comprises a machine learning model trained based on a chart specification for the chart; and transmitting, by a response component, a response to the query based on the answer and the visual description.

According to some embodiments, computing device 1200 includes one or more processors 1205. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some embodiments, memory subsystem 1210 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some embodiments, communication interface 1215 operates at a boundary between communicating entities (such as computing device 1200, one or more user devices, a cloud, and one or more databases) and channel 1230 and can record and process communications. In some cases, communication interface 1215 is provided to enable a processing system coupled to a transceiver (e.g., a transmitter and/or a receiver). In some examples, the transceiver is configured to transmit (or send) and receive signals for a communications device via an antenna.

According to some embodiments, I/O interface 1220 is controlled by an I/O controller to manage input and output signals for computing device 1200. In some cases, I/O interface 1220 manages peripherals not integrated into computing device 1200. In some cases, I/O interface 1220 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1220 or via hardware components controlled by the I/O controller.

According to some embodiments, user interface component(s) 1225 enable a user to interact with computing device 1200. In some cases, user interface component(s) 1225 include an audio device, such as an external speaker system, an external display device such as a display screen, an input device (e.g., a remote-control device interfaced with a user interface directly or through the I/O controller), or a combination thereof. In some cases, user interface component(s) 1225 include a GUI.

An example embodiment of the present disclosure includes performance evaluation based on two research questions. In some examples, the first question evaluates the performance of language models on the two CQA tasks and the second question evaluates the robustness of the language model to natural language variation. According to an embodiment, the natural language processing apparatus of the present disclosure fine-tunes T5 over 4 epochs with learning rate=$10^{-4}$, and GPT-3 over 4 epochs with learning rate multiplier=$10^{-1}$. In some cases, 8 GPUs with V100 architecture are used for T5, and OpenAI infrastructure is used for GPT-3.

In some examples, greedy decoding is executed to evaluate question answering and visual explanation generation. For question answering, a test question is considered to be correctly answered if the generated tokens match the ground-truth answer. For visual explanation generation, explanations are invariant except for two types of tokens, i.e., tokens indicating the color and the size of the visual element associated with the answer (e.g., "( . . . ) the largest orange bars."). Therefore, a test pair is considered as correctly explained if and only if the pair includes the visual element's correct color and size, and no other tokens from the category.

According to an embodiment, three independent human judges are recruited to evaluate question paraphrasing. Each judge is asked to rate the same sample of 100 automatic paraphrases in two ways, i.e., using a scale from 1 (dissimilar) to 3 (similar), based on the paraphrases preserving the meaning of the original template-generated question (i.e., a measure of semantic similarity); and more natural, or if they are equally natural between the template-generated question and the rephrased question as perceived by the human judge (i.e., as a measure of naturalness).

The question answering and visual explanation generation are evaluated on $$Q_{temp}^{test},$$

i.e., held-out questions that follow the same template seen during training. Additionally, the language models are evaluated on $$Q_{nat}^{test},$$

i.e., the manually rephrased questions. To understand if a language model-based approach can recover from a potential performance loss facing more natural questions, the training component progressively adds automatic paraphrases (i.e., parts of $$Q_{nat}^{train}$$

) to the fine-tuning scheme while measuring the effect of the additions on the performance on $$Q_{nat}^{test}.$$

An example embodiment of the present disclosure includes results for question-answering with two base models. For example, the base models can be T5-Large (737 million parameters) and GPT-3 Curie (13 billion parameters). In some examples, T5-Large achieves 57.54% test accuracy on questions that follow the same template seen in training $$(Q_{temp}^{test}).$$

In some cases, the result is substantially above any random baselines—test questions span the two categorical attributes of each bar chart. To test if language model scale affects performance, the present disclosure includes GPT-3 Curie (13 billion parameters). In some examples, with an addition of 17.5 parameters, performance of the natural language processing apparatus increases 10 absolute points to 67.54%.

An embodiment of the present disclosure includes visual explanation generation: T5-Large achieves 99.02% accuracy on questions that follow the same template seen in training $$(Q_{temp}^{test}).$$

The result confirms that the natural language processing apparatus is successful at the task, i.e., $LM_1(VC)$ successfully injects the charts' visual contexts into T5 such that $LM_2(VEG)$ can learn to access and generate factually correct explanations.

As an example, the assessments from the three independent judges had a Fleiss' Kappa of 0.61, which indicates substantial agreement. In terms of semantic similarity, rephrased questions are considered to preserve the meaning (score of 3) of the original, template-generated questions 88.33% of times, while the meaning was considered lost (score of 1) only 7.7% of times, for an average score of 2.81 (out of 3). In terms of naturalness, rephrased questions were considered more natural 82.33% of times versus only 5% for template-generated questions. Thus, the template-generated questions are rephrased to be more natural while preserving the original meaning.

An example embodiment includes performance differences from testing on $$Q_{temp}^{test} \text{ versus } Q_{nat}^{test}.$$

In some cases, a marginal performance gain from 57.54% to 58.52% and relative losses of 26% (for visual explanation generation) and 28.4% (e.g., for question-answering with GPT-3 model) are observed. In some examples, GPT-3 can be more prone to overfitting on the template-generated questions. According to another example, T5 model is given additional fine-tuning data from $$Q_{nat}^{train}.$$

The training component progressively adds to the fine-tuning scheme 10%, 30%, 50%, and 100% of $$Q_{nat}^{train},$$

while still measuring performance on $$Q_{nat}^{test}.$$

A consistent recovery of the lost performance occurs which substantially narrows the previously noted gap: 99.02% versus 88.69%. Additionally, a large part of the recovery is based on 10% of additional data: 73.28% versus 81.80%.

In an embodiment, fine-tuned language models are used to generate language through beam search instead of greedy decoding. Accordingly, the most probable sequence of tokens under a pre-defined length is selected, which is different from selecting the most probable token at each generation step.

According to another embodiment, the natural language processing apparatus uses encoder-only language models (e.g., BERT, ROBERTa) instead of encoder-decoder language models. In such cases, in lieu of the "closed-book exam" assumption, the chart specification is provided as input to the language model while fine-tuning on the end-tasks (e.g., Chart Q&A or Explanation Generation). The chart specification can be either raw or transformed into statements. As a result, encoder-only language models can learn to attend to parts of the chart specification while learning to perform the end-task. However, encoder-only language models are more easily limited by the size of context windows (i.e., the maximum number of tokens that can be inserted in a prompt).

According to an embodiment, the natural language processing apparatus uses raw data in the chart specification to precompute higher-level features, which are transformed into statements. For example, consider a line chart with two lines representing the sales of two different products over a series of months. The natural language processing apparatus uses the domain facts for this chart to generate statements about the differences in sales in each month, or in each quarter, even though these facts are not directly present in the CSV file. Fine-tuning the language model on the set of high-level features can enhance the performance on the chart-related end-task.

According to another embodiment, the natural language processing apparatus uses image encoders as input in addition to the chart specifications. In some cases, image representations are useful. For example, if a question is about the number of times two lines intersect in a chart, then an image can be a more direct representation of the particular events.

Embodiments of the present disclosure are configured to use chart specifications to enhance language models with chart-reading ability. Example experiments show that for visual explanation generation, performance in the 57-67% range is more promising than the 37% reported with conventional visual encoders. The natural language processing apparatus, as described in the present disclosure, retains performance in case of natural language questions. In some examples, the natural language processing apparatus recovers 60% of the loss in T5 performance with augmented data from the question paraphrasing method, with 33% of the recovery happening with only 10% of augmentation.

Thus, embodiments of the present disclosure provide a language model-based method for processing chart-grounded question answering. The language model-based method offers a level of robustness that conventional rule-based methods structurally cannot provide. As language models continue to scale up and exhibit more sophisticated reasoning skills, the natural language processing apparatus is configured for reasoning within symbolic spaces including charts.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
   obtaining chart data, a chart specification, and a query, wherein the chart data comprises a domain attribute of a chart and a data value corresponding to the domain attribute represented in a structured text format, and wherein the chart specification comprises structured text indicating that a visual element of the chart represents the domain attribute of the chart;

generating, by an answer model, an answer to the query based on the chart data, wherein the answer model comprises a machine learning model trained based on training data including the domain attribute of the chart;

generating, by a description model, a visual description based on the answer and the chart specification by providing an output from the answer model as an input to the description model, wherein the visual description comprises a text description of the visual element representing the domain attribute and corresponding to the answer, and wherein the description model comprises a machine learning model trained based on training data including training chart specification data; and transmitting, by a response component, a response to the query based on the answer and the visual description, wherein the response answers the query and describes the visual element representing the domain attribute corresponding to the answer.

2. The method of claim 1, further comprising:

predicting a plurality of probability values for candidate answers based on the query; and selecting the answer based on the plurality of probability values.

3. The method of claim 1, wherein:

the query comprises a natural language query and the response comprises a natural language response.

4. The method of claim 1, wherein:

the machine learning model is trained to perform a question answering task and a visual explanation generation task.

5. The method of claim 1, wherein:

the chart data comprises domain facts related to the chart.

6. The method of claim 1, wherein:

the chart specification indicates a correspondence between elements of the chart and visual properties of the chart.

7. A method comprising:

obtaining training data including chart data, a chart specification, a query about a chart and a ground-truth visual description of the chart corresponding to the query, wherein the chart data comprises a domain attribute of a chart and a data value corresponding to the domain attribute represented in a structured text format, and wherein the chart specification comprises structured text indicating that a visual element of the chart represents the domain attribute of the chart;

generating, by a description model, a predicted visual description of the chart based on the chart specification by providing an output from an answer model as an input to the description model, wherein the predicted visual description comprises a text description of the visual element representing the domain attribute and corresponding to an answer generated by the answer model; and training the description model based on the predicted visual description and the ground-truth visual description.

8. The method of claim 7, further comprising:

generating the ground-truth visual description based on the chart specification for the chart.

9. The method of claim 8, further comprising:

generating a template description based on the chart specification, wherein the ground-truth visual description is generated based on the template description using a rephrasing model.

10. The method of claim 8, further comprising:

generating first description model training data based on individual rows of the chart specification and second description model training data based on relationships between the chart specification and chart data for the chart; and training the description model in a first phase based on the first description model training data and in a second phase based on the second description model training data.

11. The method of claim 7, further comprising:

generating the query based on the chart specification and the chart data for the chart.

12. The method of claim 7, further comprising:

generating a template query based on an individual row of the chart data for the chart and a query template, wherein the query comprises a rephrased version of the template query.

13. The method of claim 7, further comprising:

identifying the answer to the query, wherein the predicted visual description is generated based on the answer.

14. The method of claim 7, further comprising:

generating first answer model training data based on individual rows of the chart data for the chart and second answer model training data based on relationships between the individual rows of the chart data; and training the answer model to predict an answer to the query, wherein the answer model is trained in a first phase based on the first answer model training data and in a second phase based on the second answer model training data.

15. The method of claim 14, further comprising:

generating a template query based on an individual row of the chart data and a query template; and generating a rephrased query based on the template query using a rephrasing model, wherein the first answer model training data includes the rephrased query.

16. An apparatus comprising:

a processor;

a memory comprising instructions executable by the processor;

a user interface configured to obtain chart data, a chart specification, and a query, wherein the chart data comprises a domain attribute of a chart and a data value corresponding to the domain attribute represented in a structured text format, and wherein the chart specification comprises structured text indicating that a visual element of the chart represents the domain attribute of the chart;

an answer model configured to generate an answer to the query based on the chart data, wherein the answer model comprises a machine learning model trained based on training data including the domain attribute of the chart;

a description model configured to generate a visual description based on the answer and the chart specification by providing an output from the answer model as an input to the description model, wherein the visual description comprises a text description of the visual element representing the domain attribute and corresponding to the answer, and wherein the description model comprises a machine learning model trained based on training data including training chart specification data; and a response component configured to transmit a response to the query based on the answer and the visual description, wherein the response answers the query and describes the visual element representing the domain attribute corresponding to the answer.

17. The apparatus of claim 16, further comprising:

a template component configured to generate template sentences based on the chart data and the chart specification, wherein the answer model or the description model is trained based on the template sentences.

18. The apparatus of claim 17, further comprising:

a rephrasing model configured to generate additional training sentences based on the template sentences.

19. The apparatus of claim 16, further comprising:

an image encoder configured to encode the chart to obtain a chart representation, wherein the description model takes the chart representation as input.

20. The apparatus of claim 16, further comprising:

a training component configured to train the answer model and the description model.

* * * * *